(12) United States Patent
Honda et al.

(10) Patent No.: US 10,164,493 B2
(45) Date of Patent: Dec. 25, 2018

(54) STATOR AND BRUSHLESS MOTOR

(71) Applicant: AISAN KOGYO KABUSHIKI KAISHA, Obu-shi (JP)

(72) Inventors: Yoshihiko Honda, Obu (JP); Akira Hamajima, Obu (JP); Takashi Suefuji, Toyota (JP)

(73) Assignee: AISAN KOGYO KABUSHIKI KAISHA, Obu-Shi (JP)

( * ) Notice: Subject to any disclaimer, the term of this patent is extended or adjusted under 35 U.S.C. 154(b) by 282 days.

(21) Appl. No.: 15/127,289

(22) PCT Filed: Nov. 28, 2014

(86) PCT No.: PCT/JP2014/081559
§ 371 (c)(1),
(2) Date: Sep. 19, 2016

(87) PCT Pub. No.: WO2015/141069
PCT Pub. Date: Sep. 24, 2015

(65) Prior Publication Data
US 2017/0141634 A1    May 18, 2017

(30) Foreign Application Priority Data

Mar. 20, 2014  (JP) .................................. 2014-058659
Jun. 13, 2014  (JP) .................................. 2014-122328

(51) Int. Cl.
*H02K 3/04* (2006.01)
*H02K 3/28* (2006.01)
(Continued)

(52) U.S. Cl.
CPC ............... *H02K 3/28* (2013.01); *H02K 1/146* (2013.01); *H02K 1/2706* (2013.01); *H02K 3/522* (2013.01);
(Continued)

(58) Field of Classification Search
CPC ........ H02K 3/28; H02K 1/146; H02K 1/2706; H02K 3/522; H02K 5/12; H02K 15/095; H02K 2203/06
(Continued)

(56) References Cited

U.S. PATENT DOCUMENTS 3,979,615 A * 9/1976 Neff ..................... H01R 4/2445
310/71
7,291,955 B2  11/2007 Otsuji
(Continued)

FOREIGN PATENT DOCUMENTS

JP    S50-52453 U    5/1975
JP    H11-341720 A    12/1999
(Continued)

OTHER PUBLICATIONS

Written Opinion for PCT/JP2014/081559 dated Sep. 29, 2016 (6 pages including English translation).
(Continued)

*Primary Examiner* — Jianchun Qin
(74) *Attorney, Agent, or Firm* — Shumaker, Loop & Kendrick, LLP

(57) ABSTRACT

Each of the coils provided in a stator includes a wire introducing portion where a wire is introduced into a groove, an adjusting portion including the wire wound within the groove, and a plurality of wire layers each of which are aligned adjacent one another along an extending direction of a tooth. Among the plurality of wire layers, wires located on a periphery side-end in the odd-numbered wire layers are separated from an inner circumferential surface of the periphery by a half pitch.

10 Claims, 27 Drawing Sheets

(51) Int. Cl.
*H02K 15/095* (2006.01)
*H02K 3/52* (2006.01)
*H02K 5/12* (2006.01)
*H02K 1/14* (2006.01)
*H02K 1/27* (2006.01)

(52) U.S. Cl.
CPC ............ *H02K 5/12* (2013.01); *H02K 15/095* (2013.01); *H02K 2203/06* (2013.01)

(58) Field of Classification Search
USPC ........................................................ 310/208
See application file for complete search history.

(56) References Cited

U.S. PATENT DOCUMENTS 7,579,735 B2    8/2009  Otsuji
9,369,022 B2*   6/2016  Hayakawa ............... H02K 3/46
2006/0022549 A1*  2/2006  Otsuji .................... H02K 3/325
                                                    310/216.001
2006/0043806 A1*  3/2006  Torii ..................... H02K 3/522
                                                    310/71

FOREIGN PATENT DOCUMENTS

| | | |
|---|---|---|
| JP | H11-355995 A | 12/1999 |
| JP | 2004-140964 A | 5/2004 |
| JP | 2006-67778 A | 3/2006 |
| JP | 2007-006636 A | 1/2007 |
| JP | 2008-228471 A | 9/2008 |
| JP | 2013-13191 A | 1/2013 |

OTHER PUBLICATIONS

International Search Report (ISR) for PCT/JP2014/081559 (including English translation) dated Feb. 24, 2015 (4 pages).

* cited by examiner (First Embodiment)

(First Embodiment)

(First Embodiment)

(First Embodiment)

(First Embodiment)

(First Embodiment)

(First Embodiment)

(Comparative Example)

(Comparative Example)

(Second Embodiment)

FIG. 14 (Second Embodiment)

(Third Embodiment)

(Third Embodiment)

(Third Embodiment)

(Variant)

(Variant)

(Variant)

(Fifth Embodiment)

(Fifth Embodiment)

(Sixth Embodiment)

(Sixth Embodiment)

(Seventh Embodiment)

(Seventh Embodiment)

(Eighth Embodiment)

(Eighth Embodiment)

STATOR AND BRUSHLESS MOTOR

TECHNICAL FIELD

The technique disclosed herein relates to a stator and a brushless motor.

BACKGROUND ART

Japanese Patent Application Publication No. 2006-67778 discloses a technique of forming a coil by winding a wire on an insulator covering a tooth of an armature. Each coil includes a first layer in which a plural turns of the wire are wound parallel to each other on an outer circumference of the insulator, and a second layer in which the a plural turns of wire are wound parallel to each other on the first layer.

SUMMARY

When winding a wire on a bobbin attached to each tooth, the wire may be wound thereon while avoiding other parts of a stator, such as an outer wall of the stator for example.

In this description, a technique for suitably winding a wire while avoiding other parts of a stator will be provided.

The technique disclosed herein relates to a stator of a motor. The stator comprises a periphery; a plurality of teeth; a plurality of bobbins; and a plurality of coils. The periphery has a cylindrical shape. The plurality of teeth extends from an inner circumferential surface of the periphery toward an inner circumferential side. The plurality of teeth is disposed along a circumferential direction of the periphery with intervals between one another. The plurality of bobbins is respectively attached to the plurality of teeth. Each bobbin surrounds a side surface of the corresponding tooth at an intermediate position between a first end of the tooth on a periphery side and a second end of the tooth on an opposite side from the first. A plurality of coils is respectively disposed on the plurality of bobbins. Each of the plurality of bobbins comprises a first end-side end located on a first end side; a circumferential surface including a pair of surface portions opposing each other when seen in a cross section along an extending direction of the corresponding tooth; and a groove located at the first end-side end on at least the pair of surface portions. Each of the plurality of coils comprises: a wire introducing portion where a wire of the coil is introduced from outside of the bobbin into the groove; an adjusting portion continuously disposed with the wire introducing portion, the adjusting portion including one or two adjacent turns of the wire in the groove among turns of the wire wound one or two times around the bobbin; and a plurality of wire layers, each of the plurality of wire layers including turns of the wire disposed adjacent to each other along the extending direction of the corresponding tooth, a first wire layer of a lowest layer disposed on the pair of surface portions, among the plurality of wire layers, contacting turns of the wire included in the adjusting portion; and the circumferential surface of the bobbin. In each of the plurality of coils disposed on the corresponding pair of surface portions: an odd-numbered wire layer among the plurality of wire layers disposed on the corresponding pair of surface portions has the wire wound successively from the first end side toward a second end side, and a turn of the wire located at the first end side-end is separated from the inner circumferential surface of the periphery by a half pitch; an even-numbered wire layer among the plurality of wire layers disposed on the corresponding pair of surface portions has the wire wound successively from the second end side toward the first end side; each of second and subsequent wire layers among the plurality of wire layers includes a turn of the wire located on an end surface of the bobbin on a wire introducing portion side, and turns of the wire other than the turn of the wire located on the end surface of the bobbin; the turns of the wire other than the turn of the wire located on the end surface of the bobbin are disposed along recesses between two adjacent turns of the wire in a wire layer located one layer lower, the turn of the wire located on the end surface of the bobbin is disposed in a direction intersecting the turns of the wire in the wire layer located one layer lower.

On the surfaces of the bobbins on which the grooves are provided, the even-numbered wire layer is wound from the second end toward the first end. In this configuration, in a state where the wire in a vicinity of the periphery is to be wound in the even-numbered wire layer, the adjacent turn of the wire on the second end side to the wire to be wound is already arranged. Due to this, the wire in the vicinity of the periphery is guided by its adjacent wire, and is wound appropriately in the vicinity of the periphery. As a result, the wire or a device for winding the wire can perform the winding work while avoiding an interference with the periphery.

On the other hand, on the surfaces of the bobbins where the grooves are provided, the odd-numbered wire layer is wound from the first end toward the second end. In this configuration, when the winding of the wire in the odd-numbered layer is started, the winding needs to be performed while avoiding the periphery. According to the above configuration, a turn of the wire in the odd-numbered layer that is located at the very end of the first end side is separated from the inner circumferential surface of the periphery by a half pitch. As a result, as compared to a configuration in which the turn of the wire in the odd-number layer that is located at the very end of the first end side is located without separating from the inner circumferential surface of the periphery, the wire or the device for winding the wires can be avoided from interfering with the periphery upon winding the wire.

The technique disclosed herein relates to a stator of a motor. The stator comprises: a periphery; a plurality of teeth; a plurality of bobbins; and a plurality of coils. The periphery has a cylindrical shape. A plurality of teeth extends from an inner circumferential surface of the periphery toward an inner circumferential side. The plurality of teeth is disposed along a circumferential direction of the periphery with intervals between one another. A plurality of bobbins is respectively attached to the plurality of teeth Each bobbin surrounds a side surface of the corresponding tooth at an intermediate position between a first end of the tooth on a periphery side and a second end of the tooth on an opposite side from the first end. A plurality of coils is disposed on the plurality of bobbins. Each of the plurality of bobbins comprises a groove and an enlarged width portion. The groove is located at an end of the first end side on at least one pair of surfaces of peripheral surface of the bobbin, the at least one pair of surfaces opposing each other. An enlarged width portion enlarges a width of the groove at a portion of the groove located on one of the pair of the surface portions. A width of the enlarged width portion is smaller than a wire diameter of the wire. Each of the plurality of coils comprises: a wire introducing portion where a wire of the coil is introduced from outside of the bobbin into the groove at a portion located on another of the pair of surface portions; an adjusting portion continuously disposed with the wire introducing portion, the adjusting portion including one or two adjacent turns of the wire in the groove among turns of the wire wound one or two times around the bobbin; and a plurality of wire layers, each of the plurality of wire layers including the turns of the wire disposed adjacent to each other along the extending direction of the corresponding tooth. A lowest layer disposed on the pair of surface portions, among the plurality of wire layers, contacts turns of the wire included in the adjusting portion and the circumferential surface of the bobbin. In each of the plurality of coils disposed on the corresponding pair of surface portions, an odd-numbered wire layer among the plurality of wire layers disposed on the at least one pair of surface portions has the wire wound successively from the first end side toward a second end side; and an even-numbered wire layer among the plurality of wire layers disposed on the at least one pair of surface portions has the wire wound around successively from the second end side toward the first end side; each of second and subsequent wire layers among the plurality of wire layers includes a turn of the wire located on an end surface of the bobbin on a wire introducing portion side, and turns of the wire other than the turn of the wire located on the end surface of the bobbin. The turns of the wire other than the turn of the wire located on the end surface of the bobbin are disposed along recesses between two adjacent turns of the wire in a wire layer located one layer lower; and the turn of the wire located on the end surface of the bobbin is disposed in a direction intersecting the turns of the wire in the wire layer located one layer lower.

DETAILED DESCRIPTION

Figure 1:
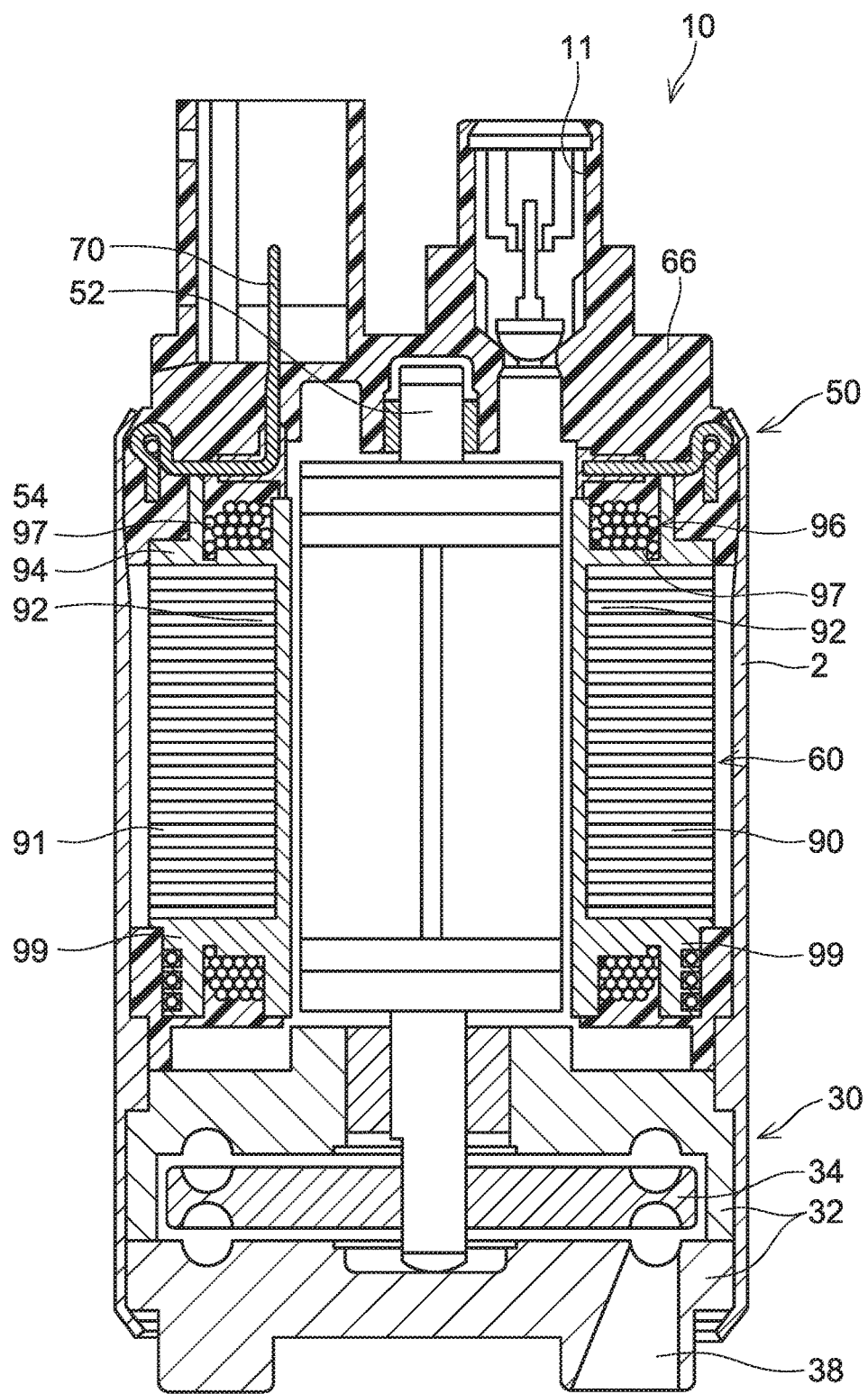
FIG. 1 is a vertical cross sectional view of a fuel pump.

Some primary features of embodiments described herein will be listed. Notably, the technical features described hereinbelow are technical elements independent of one another, and exhibit technical usefulness solely or in various combinations.

(Feature 1) In a stator a specific wire to be wound to form a first turn in the first wire layer may be disposed along the turns of the wire wound in the adjusting portion. According to this configuration, the wire to be wound in a first turn among turns of the wires in the first wire layer can appropriately be positioned. As a result, the turns of the wire in the first wire layer can be suppressed from being disturbed.

(Feature 2) In the stator, the adjusting portion may include a turn of the wire wound once adjacent to a side wall defining the groove. The specific wire may be disposed along a recess between the turn of the wire wound at the adjusting portion and an upper end of the side wall. According to this configuration, the wire to be wound in the first turn among the turns of the wires in the first wire layer can appropriately be positioned by the turn of the wire in the adjusting portion and the side wall of each groove. As a result, the turns of the wire in the first wire layer can be suppressed from being disturbed.

(Feature 3) In the stator, the adjusting portion may include two turns of the wire disposed adjacent to each other. One of the two turns of the wire may be located on the second end side, and may be adjacent to a side wall defining the groove. The specific wire may be disposed along a recess between the one of the two turns of the wire and an upper end of the side wall. According to this configuration, the wire to be wound in the first turn among the turns of the wires in the first wire layer can appropriately be positioned by the turn of the wire in the adjusting portion and the side wall of each groove. As a result, the turns of the wire in the first wire layer can be suppressed from being disturbed.

(Feature 4) In the stator, the adjusting portion may include two adjacent turns of the wire disposed adjacent to each other. The specific wire may be wound around along a recess between the two adjacent turns of the wire of the adjusting portion. According to this configuration, the wire to be wound in the first turn among the turns of the wires in the first wire layer can appropriately be positioned by the adjacent turn of the wire in the adjusting portion. As a result, the turns of the wire in the first wire layer can be suppressed from being disturbed.

(Feature 5) In the stator, the odd-numbered wire layer may include the turn of the wire located at the first end side-end separated from the inner circumferential surface of the periphery by a half pitch. The even-numbered wire layer may include a turn of the wire located at the first end side-end in contact with the inner circumferential surface of the periphery. According to this configuration, a number of the turns of the wire can be increased.

(Feature 6) In the stator, the groove may surround the circumferential surface of the bobbin at the first end side-end. According to this configuration, in a state where the turns of the wire in a vicinity of the periphery are to be wound in the even-numbered wire layer, the adjacent turn of the wire on the second end side to the wire to be wound is already arranged by being wrapped around each bobbin. Due to this, the turns of the wire in the vicinity of the periphery are guided by their adjacent turn of the wire over the entire circumference of the bobbin, and are wound appropriately in the vicinity of the periphery. Due to this, the wire can be arranged appropriately on the first end side.

(Feature 7) A brushless motor comprising the above-described stator, and a pump comprising the motor are also novel and useful.

(Feature 8) In the stator, each of the grooves may be located on at least a pair of surface portions included in the circumferential surface of the corresponding bobbin, the one pair of surface portions extending along an axial direction of the periphery. Each of the plurality of bobbins may comprise an enlarged width portion enlarging a width of the groove at a portion of the groove located on one of the pair of the surface portions. A width of the widen portion may be smaller than a wire diameter of the wire. The introducing portion may be disposed in the groove on another of the pair of surface portions. According to this configuration, the wire wound on the adjusting portion can be suppressed from slipping off of the adjusting portion.

(First Embodiment)

As shown in FIG. 1, a stator 60 and a motor 50 of the present embodiment are arranged in a fuel pump 10. The fuel pump 10 is to be arranged in a fuel tank (not shown), and supplies fuel (e.g., gasoline) to an engine (not shown) of a vehicle such as a car. As shown in FIG. 1, the fuel pump 10 further comprises a pump 30, other than the motor 50. The motor 50 and the pump 30 are arranged in a housing 2. The housing 2 has a cylindrical shape with both ends opened.

The pump 30 comprises a casing 32 and an impeller 34. The casing 32 closes a lower end opening of the housing 2. A suction introducing portion 38 is provided at a lower end of the casing 32. A communication hole (not shown) for communicating inside of the casing 32 and the motor 50 is provided at an upper end of the casing 32. The impeller 34 is housed within the casing 32.

The motor 50 is located above the pump 30. The motor 50 is a brushless motor, and is a three-phase motor. The motor 50 comprises a rotor 54, a stator 60, and a terminal 70. The rotor 54 comprises a permanent magnet. A shaft 52 is penetrating and fixed to a center of the rotor 54. A lower end of the shaft 52 is inserted and penetrating a center part of the impeller 34. The rotor 54 is rotatably supported about the shaft by bearings arranged on both ends of the shaft 52. Notably in the embodiments, vertical direction thereof is defined in the state of FIG. 1. That is, the pump 30 is located "below" as seen from the motor 50, and the motor 50 is located "above" as seem from the pump 30.

The stator 60 is covered by a resin layer 66. The resin layer 66 closes the upper end opening of the housing 2. The discharging outlet 11 is provided at an upper end of the resin layer 66. The discharging outlet 11 communicates the motor 50 and the outside of the fuel pump 10. The discharging outlet 11 is an opening for discharging the fuel pressurized by the pump 30 to a fuel passage. In the resin layer 66, a portion covering the stator 60 and the discharging outlet 11 are formed integrally by resin. Notably, the portion covering the stator 60 and the discharging outlet 11 may be configured separately.

The stator 60 comprises a core main body 90 and a plurality of (six in this embodiment) coils 96 arranged on the core main body 90. A terminal 70 is attached to the upper end of the stator 60. The terminal 70 is connected to a battery via a control circuit (both of which are not shown). The terminal 70 is a terminal for providing electric power to the coils 96 of the stator 60.

The core main body 90 comprises a set of core plates (92, 92, . . . ,), and an insulator 94 provided on a surface of the set of the core plates (92, 92, . . . ,). The set of the core plates (92, 92, . . . ,) is configured of plural pieces of core plates 92. Notably, in FIG. 1, a hatching indicating cross sections of the plural pieces of core plates 92 is omitted. The plural pieces of core plates 92 are laminated in an up and down direction, and each core plate 92 is made of a magnetic material. The insulator 94 is made of an insulating resin material. The insulator 94 covers the surface of the set of the core plate (92, 92, . . . ,) configured of the laminated plural pieces of core plates 92.

Figure 2:
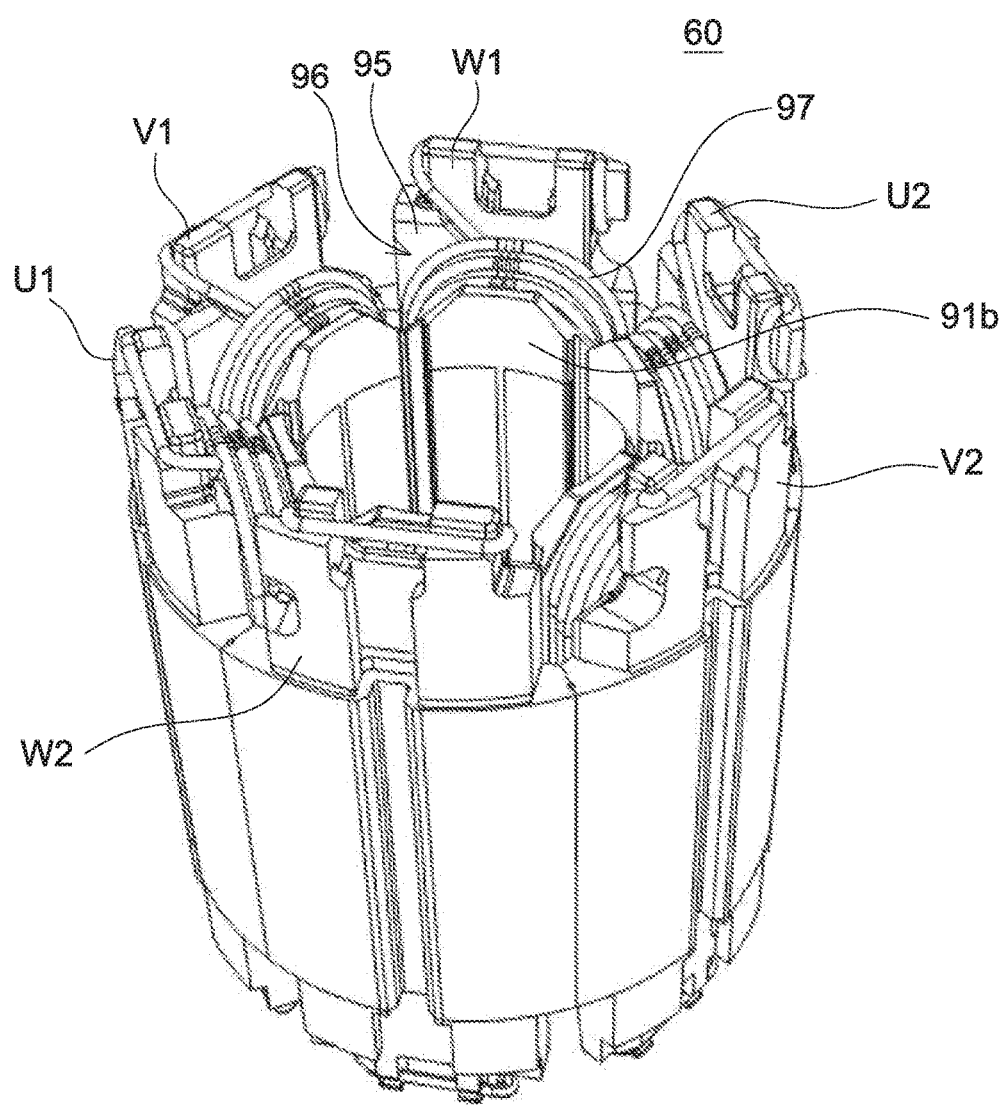
FIG. 2 is a perspective view of a stator.

As shown in FIG. 2, the core main body 90 comprises six partial cores U1, V1, W1, U2, V2, W2. The six partial cores U1 to W2 are arranged in a cylindrical shape. The six partial cores U1 to W2 are configured of two U-phase partial cores U1, U2, two V-phase partial cores V1, V2, and two W-phase partial cores W1, W2. Notably, since all of the partial cores U1 to W2 have a substantially identical configuration, an explanation will be given for the partial core W1 as the representative thereof.

Figure 3:
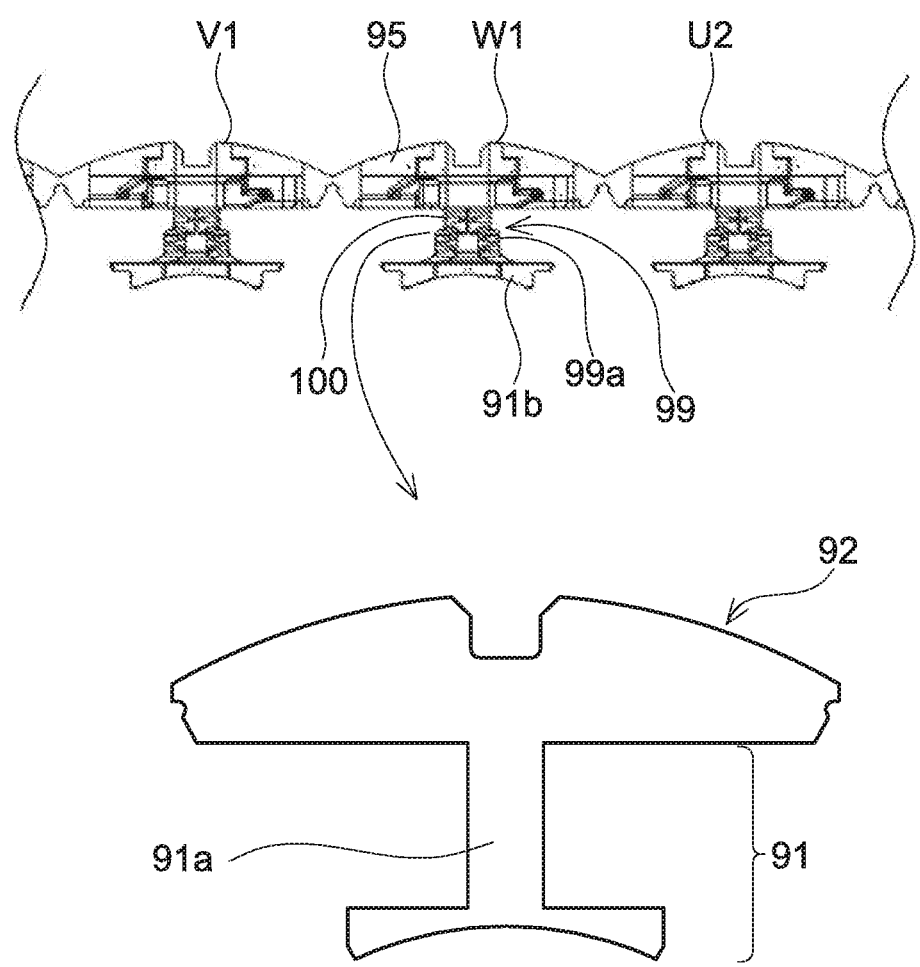
FIG. 3 is a plan view of an expanded core main body.

The partial core W1 comprises a periphery 95 and a tooth 91 (see FIG. 3) and a bobbin 99 (see FIG. 3). The periphery 95 is positioned on the outermost side of the partial core W1. The periphery 95 is configured of a peripheral portion of the core plate 92, and the insulator 94 covering the peripheral portion of the core plate 92. An outer circumferential surface of the periphery 95 has a partial cylindrical shape. An inner circumferential surface of the periphery 95 has a flat plate shape. The periphery 95 is connected to the peripheries 95 of the adjacent partial cores U2, V1. The cylindrical shape is formed by the six partial cores U1 to W2 being connected by their peripheries 95.

As shown in FIG. 3, the tooth 91 extending toward a center of the stator 60 is arranged at a center portion of the periphery 95. Notably, in FIG. 3, the partial core W1 and the partial cores U2, V1 adjacent to the partial core W1 are depicted, however, in an expanded state of the core main body 90 shown in FIG. 3, the six partial cores U1 to W2 are arranged linearly as shown by the partial cores W1, V1, U2.

The tooth 91 is configured by a portion of the core plate 92 extending from the peripheral portion of the core plate 92 configuring the periphery 95 toward an inner circumferential side of the periphery 95. Notably, in FIG. 3, the portion corresponding to the partial core W1 is depicted within the core plate 92, however, in reality the core plate 92 has the portions corresponding to the six partial cores U1 to W2 connected.

As shown in FIG. 2, six teeth 91 arranged in the six partial cores U1 to W2 are arranged at regular intervals in a circumferential direction of the peripheries 95. As shown in FIG. 3, an intermediate portion 91*a* of each tooth 91 extends to the inner circumferential side of the periphery 95 (lower side in FIG. 3) from the corresponding periphery 95. An inner circumferential end of the tooth 91 extends in the circumferential direction of the peripheries 95, and has a shape following an outer circumferential surface of the rotor 54. The tooth 91 is covered by the insulator 94. An inner circumferential portion 91*b* covered by the insulator 94 is provided at an inner circumferential end of the tooth 91.

The bobbin 99 is configured by the insulator 94 covering the tooth 91, at a portion thereof that covers the intermediate portion 91*a*. The bobbin 99 surrounds a side surface of the intermediate portion 91*a*. More specifically, the bobbin 99 covers four surfaces of the intermediate portion 91*a* that are positioned between the periphery 95 and the inner circumferential end of the tooth 91. Guides 99*a* for supporting a wire 97 are provided on an outer circumferential surface of the bobbin 99. The guides 99*a* have a recessed shape that is formed on the outer circumferential surface of the bobbin 99. The guides 99*a* are provided respectively at four corners of the bobbin 99 at the least. Notably, a guide 99*a* may be provided over an entire circumference of the outer circumferential surface of the bobbin 99. The guides 99*a* have a shape following an outer shape of the wire 97.

A groove 100 is provided at an end of the bobbin 99 on a periphery 95 side. In the groove 100, the outer circumferential surface of the bobbin 99 is recessed than other portions of the outer circumferential surface of the bobbin 99. In other words, in the groove 100, the outer circumferential surface of the bobbin 99 is located closer to the tooth 91 than other portions of the outer circumferential surface of the bobbin 99. The groove 100 is provided over an entire circumference of the outer circumferential surface of the bobbin 99. Due to this, a circumferential length of the bobbin 99 having the groove 100 provided thereon is shorter than a circumferential length of the bobbin 99 at other portions. A width of the groove 100 (that is, a length of the groove 100 in a radial direction of the stator 60) is substantially equal to a wire diameter of the wire 97. A depth of the groove 100 (that is, a length of the groove 100 in a vertical direction in a cross section of the groove 100) is substantially equal to the wire diameter of the wire 97.

As shown in FIG. 2, a coil 96 is arranged on each bobbin 99. The coil 96 is made by winding the wire 97 on the bobbin 99. The coil 96 is electrically connected to the terminal 70. The coil 96 of the partial core W1 is connected to the coil 96 of the partial core W2, and a potential of a same phase is supplied to the coil 96 of the partial core W1 and the coil 96 of the partial core W2. Similarly, the coil 96 of the partial core U1 is connected to the coil 96 of the partial core U2, and a potential of a same phase is supplied to the coil 96 of the partial core U1 and the coil 96 of the partial core U2. Moreover, similarly, the coil 96 of the partial core V1 is connected to the coil 96 of the partial core V2, and a potential of a same phase is supplied to the coil 96 of the partial core V1 and the coil 96 of the partial core V2.

(Wire Winding Method)

Figure 6:
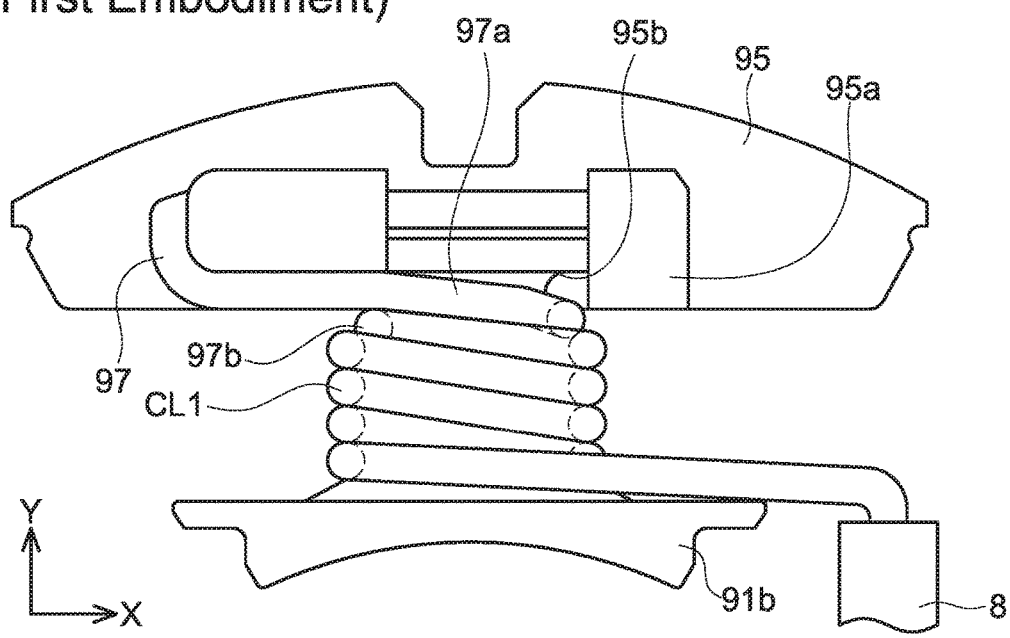
FIG. 6 is a view seeing the partial core from above for explaining the process of winding the wires on the bobbin of the first embodiment.
Figure 7:
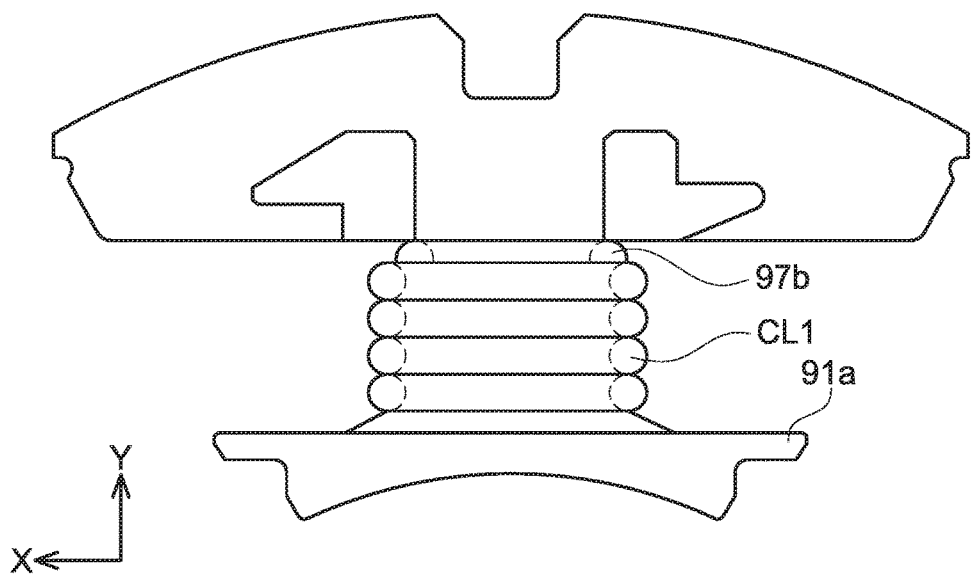
FIG. 7 is a view seeing the partial core from below for explaining the process of winding the wires on the bobbin of the first embodiment.

Next, a method of producing the coils 96 by winding wires 97 will be described with reference to FIGS. 4 to 10. As shown in FIG. 3, the wires 97 are wound in a state where the partial cores U1 to W2 are arranged linearly. Notably, in the drawings from FIG. 4 and on, the guides 99*a* provided on the bobbins 99 are omitted, and further simplification is made for easier view. Each wire 97 is wound in the order of FIG. 4 to FIG. 9. Notably, FIG. 7 is a view showing a wound state of the wire 97 at the same timing as a state shown in FIG. 6, and FIG. 6 is a view seeing the partial core W1 from above, whereas FIG. 7 is a view seeing the partial core W1 from below. FIG. 10 shows a state after the coil 97 has been produced, and the wire 97 is shown by a cross section at a portion on an upper surface of the bobbin 99.

Figure 4:
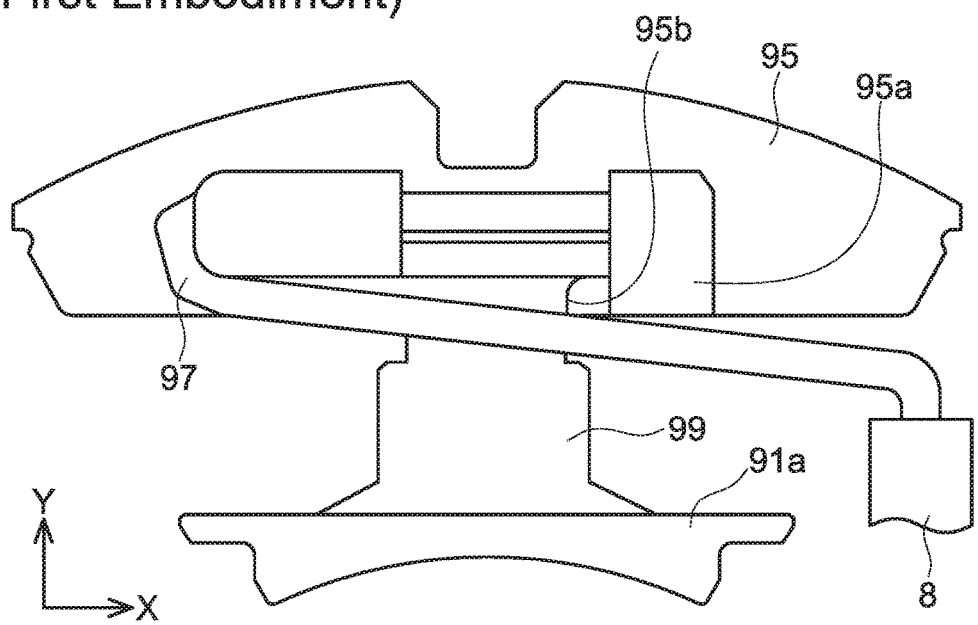
FIG. 4 is a view seeing a partial core from above for explaining a process of winding wires on a bobbin of a first embodiment.

As shown in FIG. 4, firstly, one end of the wire 97 is engaged onto an engaging portion 95*a* positioned at an upper end of the periphery 95. Notably, the wire 97 is supplied from a winding device 8. Then, the wire 97 engaged by the engaging portion 95*a* is drawn from a left side of the bobbin 99 to a right side of the bobbin 99 by passing over the upper surface of the bobbin 99. Then, as shown in FIG. 5, the winding device 8 is moved along the circumferential direction of the bobbin 99, and the wire 97 is wound in the groove 100.

Figure 5:
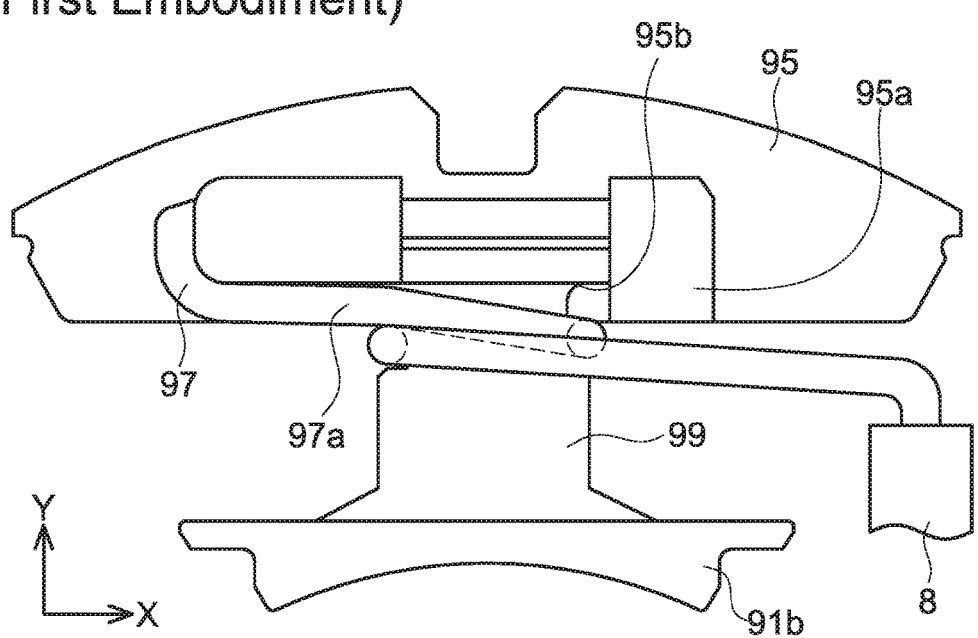
FIG. 5 is a view seeing the partial core from above for explaining the process of winding the wires on the bobbin of the first embodiment.

As a result of this, as shown in FIG. 5, the wire 97 extends through a wire introducing portion 97*a* from the engaging portion 95*a* to the groove 100, and is arranged within the groove 100. More specifically, the wire 97 is introduced from the wire introducing portion 97*a* into the groove 100 through an expanded portion 95*b* provided in the periphery 95. The expended portion 95*b* expands the width of the groove 100 toward the periphery 95 side. The expanded portion 95*b* is shaped such that the width of the groove 100 gradually becomes smaller toward the lower side. In other words, a length of the expanded portion 95*a* in the radial direction of the rotor 54 becomes gradually shorter toward the lower side. Further, the expanded portion 95*b* disappears at a center portion of the groove 100 in the up and down direction. The expanded portion 95*b* is provided to avoid interference from the wire 97 residing in the wire introducing portion 97*a* upon winding the wire 97 on the bobbin 99. Thus, the wire 97 in the expanded portion 95*b* may move in a Y-axis direction by being pressed by other portions of the wire 97 while winding the wire 97 on the bobbin 99.

From the state of FIG. 5, the winding device 8 is further moved in the circumferential direction of the bobbin 99, and is moved parallel to the Y axis toward the inner circumferential portion 91*b* as the wire 97 progresses along the Y axis. Due to this, as shown in FIGS. 6 and 7, an adjusting portion 97*b* and a first wire layer CL1 is formed thereby. The adjusting portion 97*b* is formed in the groove 100 by the wire 97 being wound once. In the wire layer CL1, the wire 97 is wound tightly from the periphery 95 side-end of the bobbin 99 toward an opposite end thereof; that is, the wire 97 is wound adjacently. That is, a pitch of the coil 96 is equal to the wire diameter of the wire 97. Specifically, the wire 97 at the periphery 95 side-end of the bobbin 99 in the wire layer CL1 is wound along a recess created by the wire 97 of the adjusting portion 97b and a side surface of the groove 100 (see a recess X1 in FIG. 10). According to this configuration, the wire 97 forming a first turn can appropriately be positioned among turns of the wire 97 in the wire layer CL1. As a result, the turns of the wire 97 wound thereafter in the wire layer CL1 can be suppressed from being disturbed. The turn of the wire 97 at the periphery 95 side-end of the bobbin 99 in the wire layer CL1 (that is, wires C3, C4 in FIG. 10) is separated from the inner circumferential surface of the periphery 95 by substantially a half pitch (that is, a length that is ½ of the wire diameter of the wire 97). On the other hand, the turn of the wire 97 at an inner circumferential portion 91b side-end of the bobbin 99 in the wire layer CL1 (that is, wires C11, C12 in FIG. 10) makes contact with the inner circumferential portion 91b.

As is apparent from the comparison of FIGS. 6, 7, in the wire layer CL1 being the first layer, the turns of the wire 97 arranged on the upper end surface of the bobbin 99 are inclined relative to an X axis, whereas the turns of the wire 97 arranged on the lower end surface of the bobbin 99 are wound vertical (that is, parallel to the X axis direction) to a progressing direction of the wire 97 (that is, Y axis direction).

Figure 8:
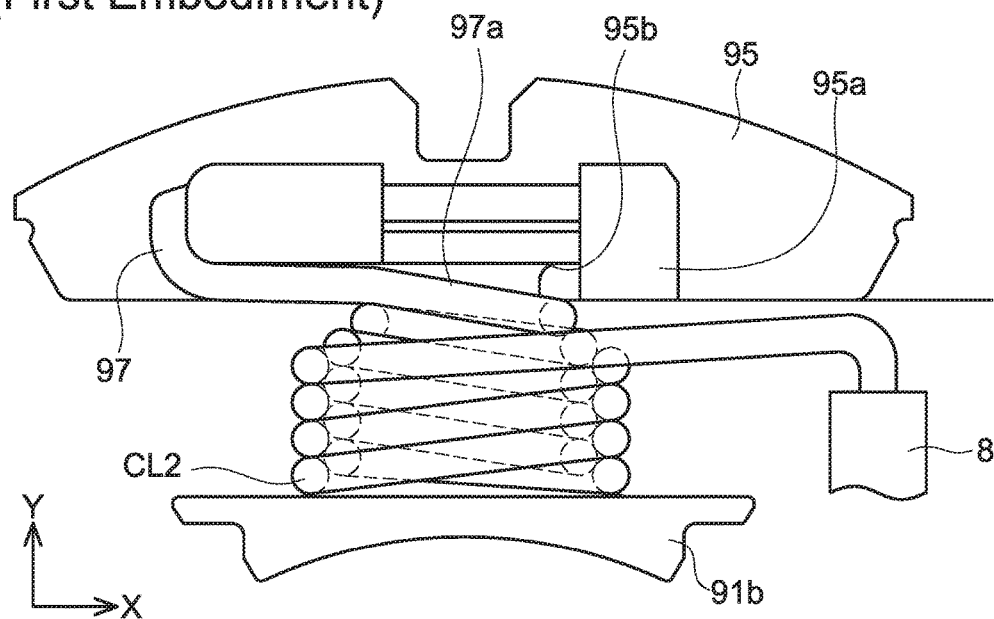
FIG. 8 is a view seeing the partial core from above for explaining the process of winding the wires on the bobbin of the first embodiment.

Next, the winding device 8 is moved along the circumferential direction of the bobbin 99 and is moved from the inner circumferential portion 91b toward the periphery 95 along with the progress of the wire 97. As a result, as shown in FIG. 8, a wire layer CL2 being a second layer is formed. In the wire layer CL2, the wire 97 is wound tightly from the inner circumferential portion 91b side-end of the bobbin 99 toward the periphery 95 side-end. Specifically, in the wire layer CL2, the turn of the wire 97 at the inner circumferential portion 91b side-end of the bobbin 99 (that is, wires C11, C12 in FIG. 10) makes contact with the inner circumferential portion 91b, and the turn of the wire 97 (that is, wires C19, C20 in FIG. 10) at the periphery 95 side-end make contact with the periphery. Further, the turns of the wire 97 except for both ends in the wire layer CL2 (that is, wires C13 to C18 in FIG. 10) are wound along recesses formed between the turns of wire 97 in the wire layer CL1.

As shown in FIG. 8, when the turn of the wire 97 at the periphery 95 side-end (that is, wires C19, C20 in FIG. 10) is to be wound, the wire 97 is wound by contacting it to the previously-wound turn of the wire 97 at the periphery 95 side-end (that is, wires C17, C18 in FIG. 10). More specifically, when the wire 97 is arranged at the position indicated by the wire C21 in FIG. 10 and wound thereat, the wire 97 slips off along the wire C17 and would be placed at the position of the wire C19. Due to this, the winding can be performed without having have to bring the winding device 8 close to the periphery 95 to an extent by which the device may make contact with the periphery 95.

Further, in the wire layer CL2, the turns of the wire 97 arranged on the upper end surface of the bobbin 99 are inclined toward the progressing direction along the Y axis of the wire 97 relative to the X axis, whereas the turns of the wire 97 arranged on the lower end surface of the bobbin 99 are wound to intersect with the turns of the wire 97 on the wire layer CL1.

Next, from the state shown in FIG. 8, the winding device 8 is moved along the circumferential direction of the bobbin 99 to form a wire layer CL3 being a third layer (see FIG. 10). As a result, the turn of the wire 97 wound at the periphery 95 side-end of the wire layer CL3 (that is, wires C21, C22 in FIG. 10) is wound along a recess X2 formed by two turns of the wire 97 wound from the periphery 95 side-end of the wire layer CL2 (that is, wires C11 to C20 in FIG. 10).

As a result, the turn of the wire 97 at the periphery 95 side-end of the bobbin 99 of the wire layer CL3 (that is, wires C21, C22 in FIG. 10) are separated from the inner circumferential surface of the periphery 95 by substantially a half pitch. According to this configuration, the winding can be performed without having have to bring the winding device 8 close to the periphery 95 to the extent by which the device may make contact with the periphery 95.

Figure 9:
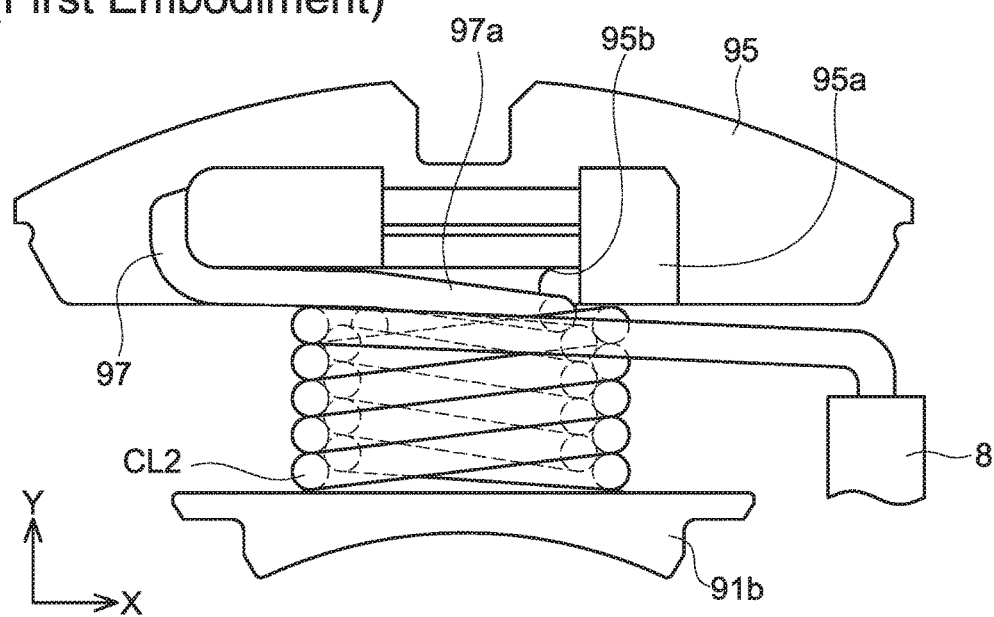
FIG. 9 is a view seeing the partial core from above for explaining the process of winding the wires on the bobbin of the first embodiment.
Figure 10:
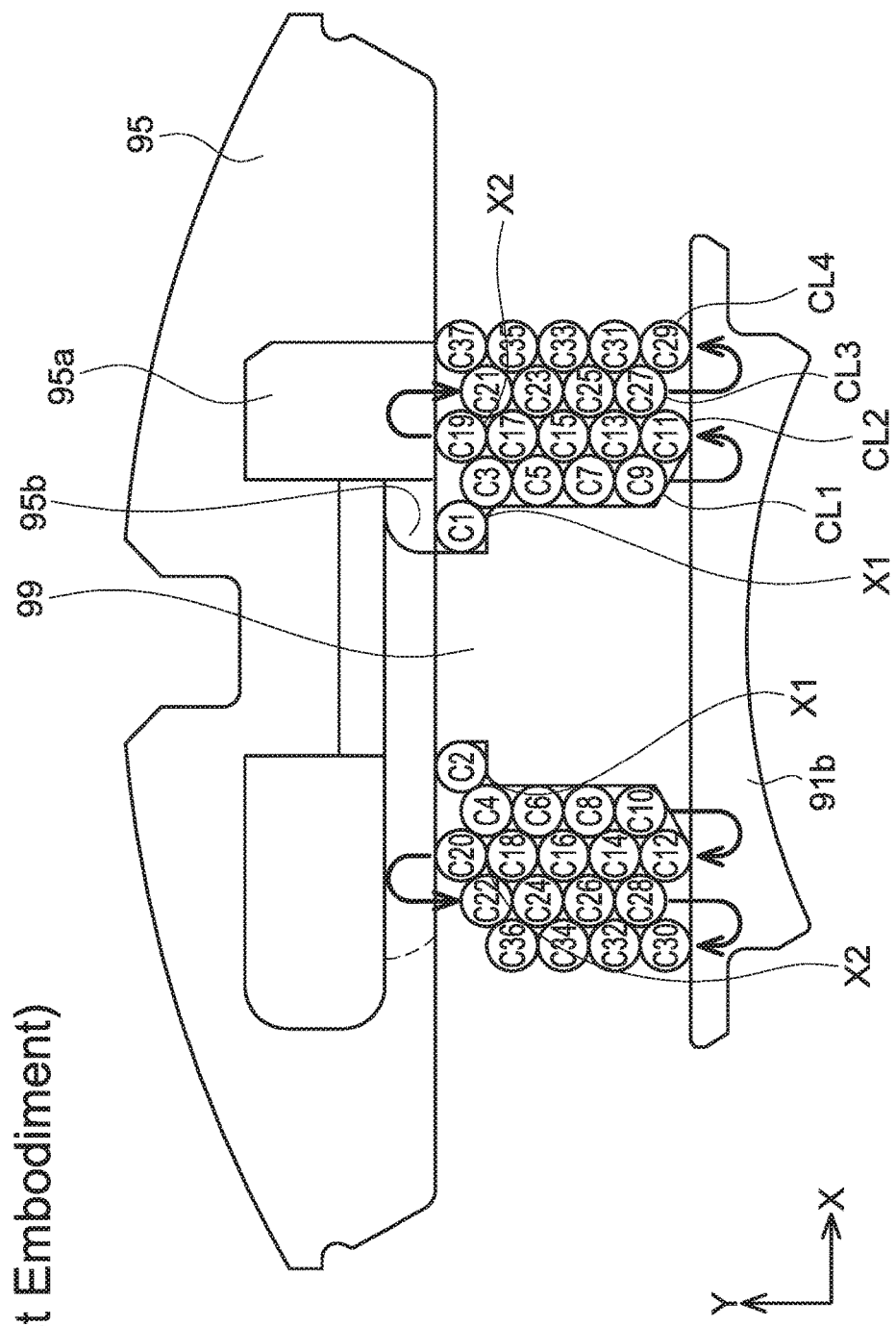
FIG. 10 is a diagram for explaining a wound state of the wires in the first embodiment.

From the state shown in FIG. 9, the coil 96 is produced by moving the winding device 8 along the circumferential direction of the bobbin 99 and between the periphery 95 and the inner circumferential portion 91b to form wire layers CL3, CIA. Notably, an end of the wire 97 of the coil 96 is connected to the wire 97 of the coil 96 arranged in the partial core W2. Similarly, an end of the wire 97 of the coil 96 of the partial core U1 is connected to the wire 97 of the coil 96 arranged in the partial core U2, and an end of the wire 97 of the coil 96 of the partial core V1 is connected to the wire 97 of the coil 96 arranged in the partial core V2.

As shown in FIG. 10, in each coil 96, the wires C3, C4, C21, C22 are separated from the inner circumferential surface of the periphery 95 by ½ of the wire diameter of the wire 97 in the odd-numbered wire layers CL1, CL3. On the other hand, in the even-numbered wire layers CL2, CL4, the wires C19, C20, C37 make contact with the inner circumferential surface of the periphery 95. Notably, in a variant, each coil 96 may be configured of 5 or more wire layers. In this variant as well, the wire may be separated from the inner circumferential surface of the periphery 95 by ½ of the wire diameter of the wire 97 in the odd-numbered wire layers CL1, CL3, . . . , and the wire may be in contact with the inner circumferential surface of the periphery 95 in the even-numbered wire layers CL2, CL4, . . . .

(Effects of Present Embodiment)

Figure 11:
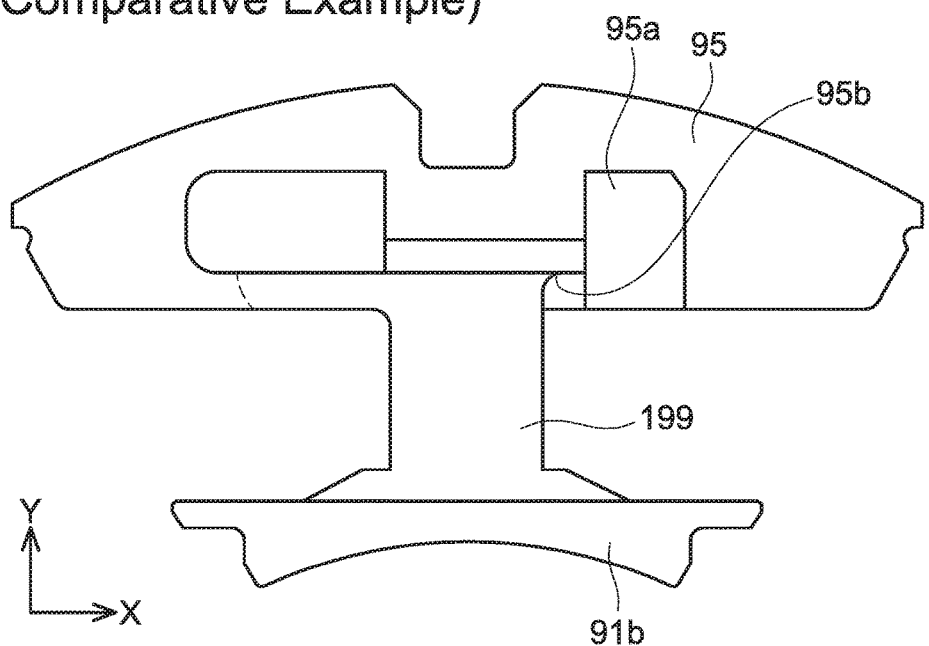
FIG. 11 is a plan view of a partial core of a comparative example.
Figure 12:
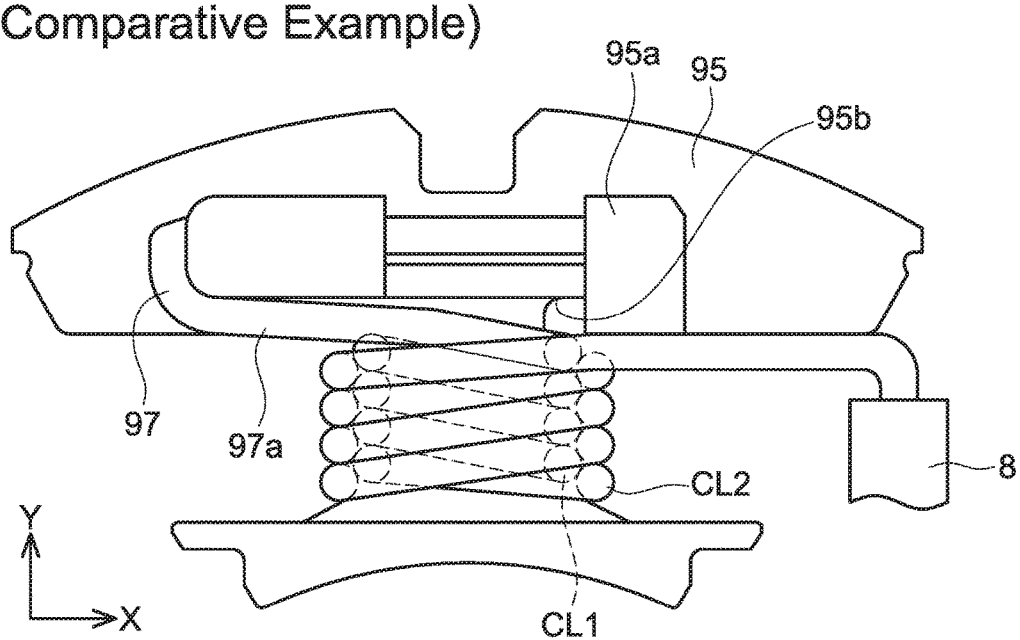
FIG. 12 is a view seeing the partial core from above for explaining a process of winding wires on a bobbin of the comparative example.

The effects of the present embodiment will be described by comparison to a comparative example shown in FIGS. 11, 12. In the comparative example, no groove 100 is provided in the bobbins 199, thus its circumferential length is same over its entirety form the periphery 95 side-end to the inner circumferential portion 91b side-end. In this comparative example, as shown in FIG. 12, the turns of the wire 97 in the first wire layer CL1 make contact with the inner circumferential surface of the periphery 95, whereas the turns of the wire 97 in the second wire layer CL2 are separated from the inner circumferential surface of the periphery 95 by substantially a half pitch. In this configuration, if the wire 97 is wound as tight as possible in the coil 96, the turn of the wire 97 at the periphery 95 side-end in the third wire layer CL3 needs to be arranged to make contact with the inner circumferential surface of the periphery 95.

However, the turn of the wire 97 at the periphery 95 side-end is the wire that is wound as the first turn among the turns of the wire 97 in the third wire layer CL3. Due to this, the third wire layer does not have any wire wound thereon that would guide the turn of the wire 97 at the periphery 95 side-end. Thus, the wire 97 at the periphery 95 side-end is wound along a recess between the turn of the wire 97 at the periphery 95 side-end in the second wire layer and the inner circumferential surface of the periphery 95. Due to this, the wire 97 needs to be wound in the state of having brought the winding device 8 close to the periphery 95. Further, in this state, if the wire 97 extending from the winding device 8 is pulled strongly, the wire 97 slips out from the recess between the turn of the wire 97 at the periphery 95 side-end in the second wire layer and the inner circumferential surface of the periphery 95, and there is a case where it cannot be wound appropriately.

As shown in FIG. 10, the stator 60 of the present embodiment has the adjusting portions 97b provided thereon, thus the odd-numbered wire layers CL1, CL3 (that is, wires C3, C4, C21, C22) are separated from the inner circumferential surface of the periphery 95 by substantially a half pitch. Due to this, the situation as in the comparative example can be avoided. Further, the even-numbered wire layers CL2, CL4 (that is, wires C19, C20, C37) make contact with the inner circumferential surface of the periphery 95, however, in the even-numbered wire layers CL2, CL4, the wire 97 is wound from the inner circumferential portion 91b toward the periphery 95. Due to this, in the state of winding the turns for the wires C19, C20, C37, the turn of the wire 97 adjacent to the turn of the wire 97 to make contact with the inner circumferential surface of the periphery 95 (that is, wires C17, C18, C35) is already wound in the even-numbered wire layers CL2, CL4. Thus, the wires C19, C20, C37 are appropriately wound by being guided by the wires C17, C18, C35. According to the configuration of the present embodiment, the wire 97 can appropriately wound at high density without causing it to make strong contact with the periphery 95.

Further, in the comparative example shown in FIG. 12, in the third wire layer, the wire 97 interferes with the turn of the wire 97 at the wire introducing portion 97a upon winding the wire 97 for forming the first turn. Due to this, it is difficult to wind the wire 97 to make contact with the inner circumferential surface of the periphery 95. On the other hand, in the present embodiment, as shown in FIG. 9, the turn of the wire 97 wound at the periphery 95 side-end in the third wire layer CL3 are wound along the recess between two turns of the wire 97 on the periphery 95 side of the wire layer CL2 including the turn of the wire 97 wound at the periphery 95 side-end in the second wire layer CL2 (wires C17 and C19, C18 and C20), thus are not influenced by the turn of the wire 97 in the wire introducing portion 97a during their winding operation. According to the stator 60 of the present embodiment, the wire 97 can be avoided from making contact with the wire introducing portion 97a upon winding the wire 97, leading to disturbed winding.

(Second Embodiment)

Points differing from the first embodiment will be described with reference to FIGS. 13, 14. In the present embodiment, as compared to the first embodiment, a shape of a groove 200 is different from a shape of the groove 100 in the first embodiment. Further, in the present embodiment, a winding method of the wires 97 configuring the coils 96 is different compared to the first embodiment.

Figure 14:
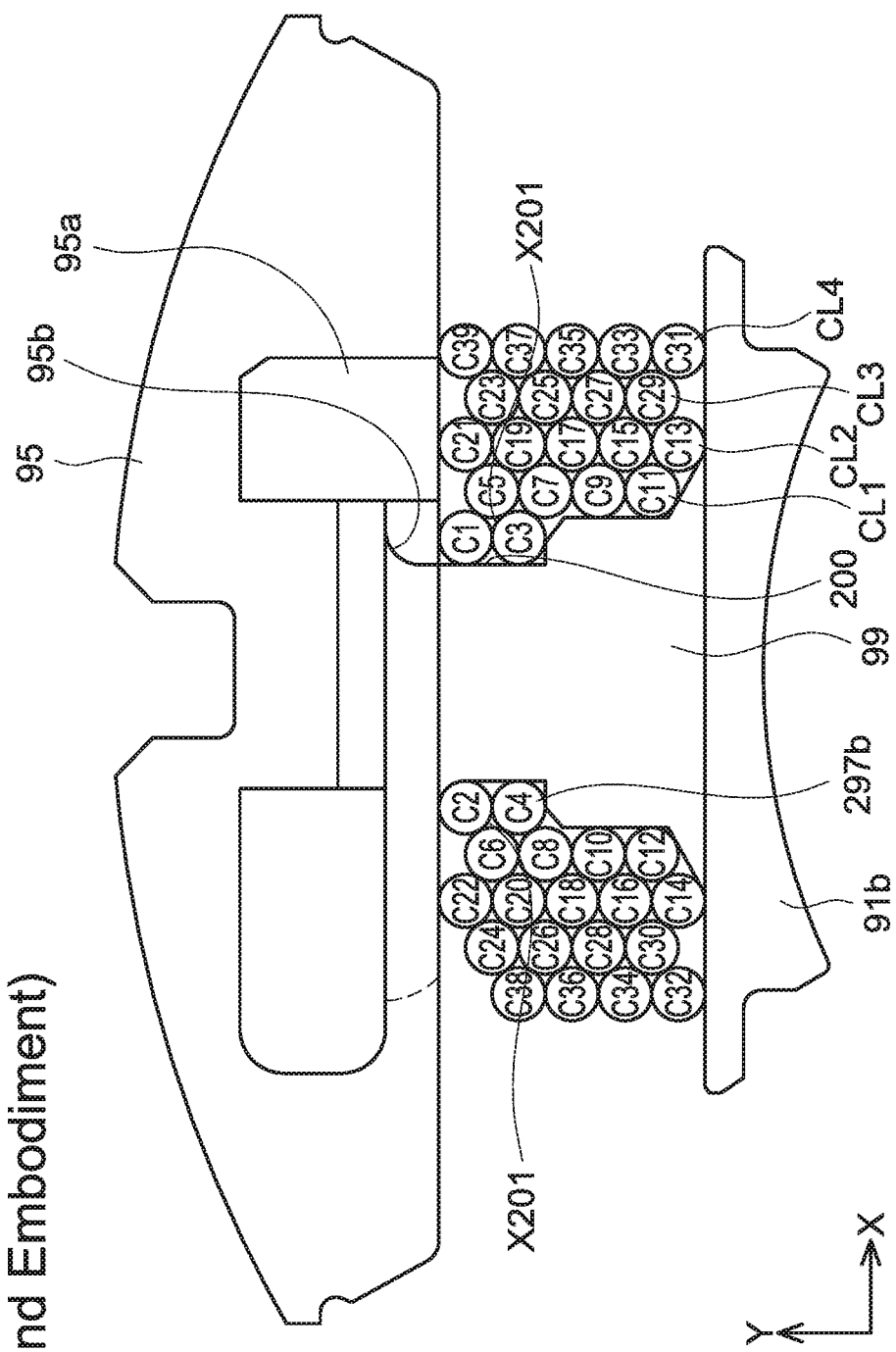
FIG. 14 is a view seeing the partial core from above for explaining a wound state of the wires in the second embodiment.

As shown in FIG. 14, the groove 200 is provided at the periphery 95 side-end of the bobbin 99 similar to the groove 100, and in the groove 200, the outer circumferential surface of the bobbin 99 is recessed than other portions of the outer circumferential surface of the bobbin 99. A width of the groove 200 is substantially equal to twice the wire diameter of the wire 97. Other configurations of the groove 200 are identical to those of the groove 100.

(Wire Winding Method)

Figure 13:
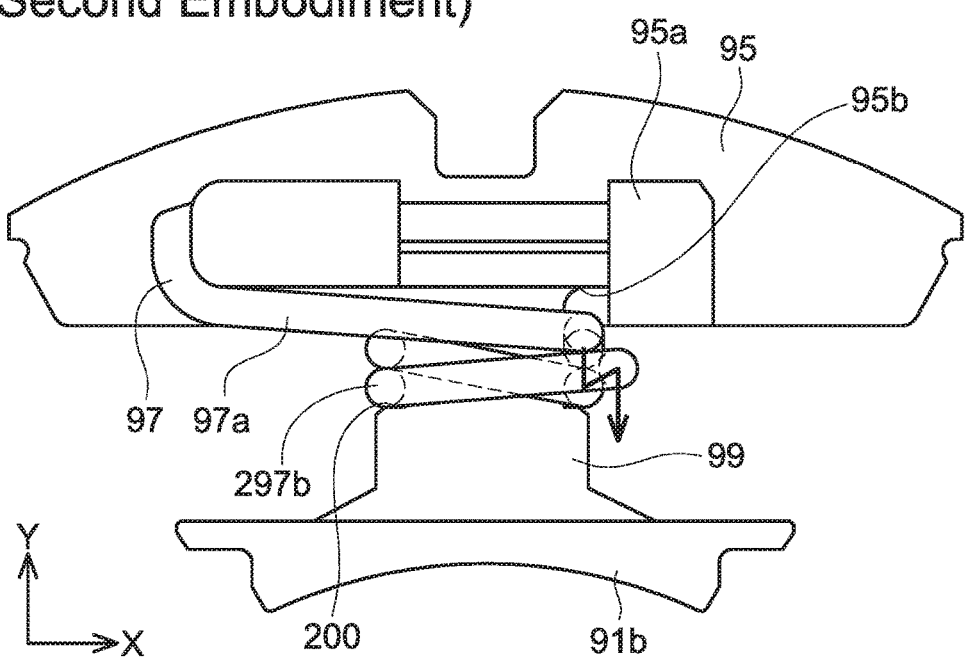
FIG. 13 is a view seeing a partial core from above for explaining a process of winding wires on a bobbin of a second embodiment.

As shown in FIG. 13, the wire 97 passes through the wire introducing portion 97a similar to the first embodiment, and is arranged in the groove 200. Then, the wire 97 is wound twice in the groove 200. As a result, two turns of the wire 97 that are adjacent in the Y axis direction are arranged in the groove 200. As shown in FIG. 14, the wire 97 in the groove 200 is wound along a direction from the periphery 95 toward the inner circumferential portion 91b, that is, in an order of wires C1, C2, C3, C4. Due to this, an adjusting portion 297b is formed within the groove 200.

When the adjusting portion 297b is formed, then as shown by an arrow in FIG. 13, the wire 97 is wound on the adjusting portion 297b. As a result, the first turn of wires C5, C6 is wound for the wire layer CL1. The turn of the wires C5, C6 are wound along a recess X201 formed by the turns of the wires C1, C2, C3, C4 in the adjusting portion 297b. According to this configuration, the first turn of the wire 97 in the turns of the wire 97 in the wire layer CL1 can appropriately be positioned. As a result, the turns of the wire 97 in the wire layer CL1 to be wound hereafter can be suppressed from being disturbed. Notably, in this winding method, the wire 97 to form the first turn of the wire 97 among the turns of the wire 97 in the wire layer CL1 intersects with the turns of the wire 97 forming the adjusting portion 297b on an upper end side of the bobbin 99.

Next, as shown in FIG. 14, similar to the first embodiment, the wire 97 is wound to form the wire layers CL1 to CL4, and the coil 96 is thereby produced. Notably, each coil 96 may be configured of 5 or more wire layers.

In the present embodiment as well, the effects similar to those of the first embodiment can be achieved.

(Third Embodiment)

Points differing from the second embodiment will be described with reference to FIGS. 15 to 17. In the present embodiment, as compared to the second embodiment, a winding method of the wires 97 configuring the coils 96 is different.

(Wire Winding Method)

Figure 15:
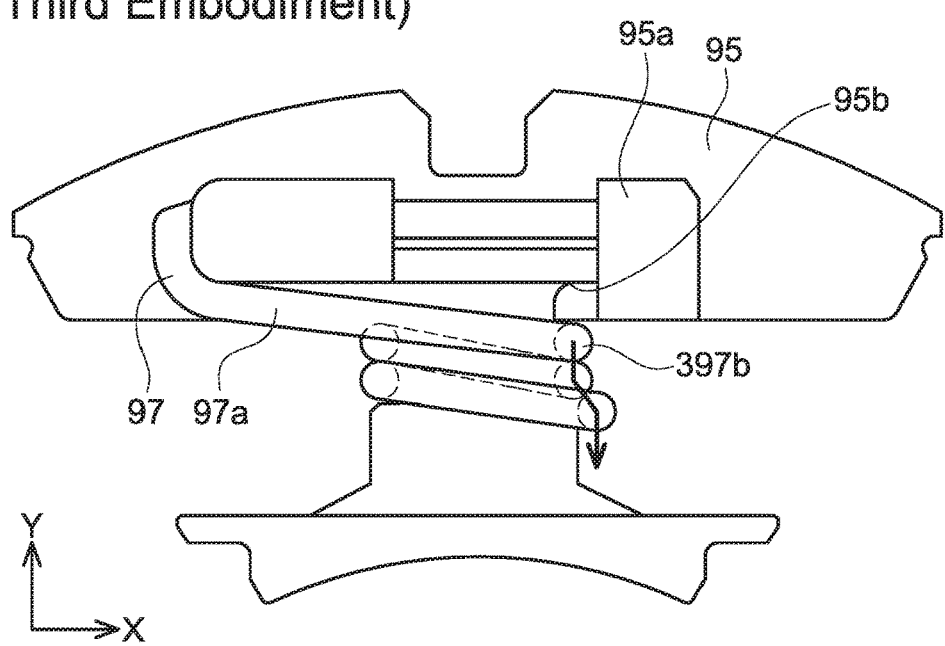
FIG. 15 is a view seeing a partial core from above for explaining a process of winding wires on a bobbin of a third embodiment.
Figure 16:
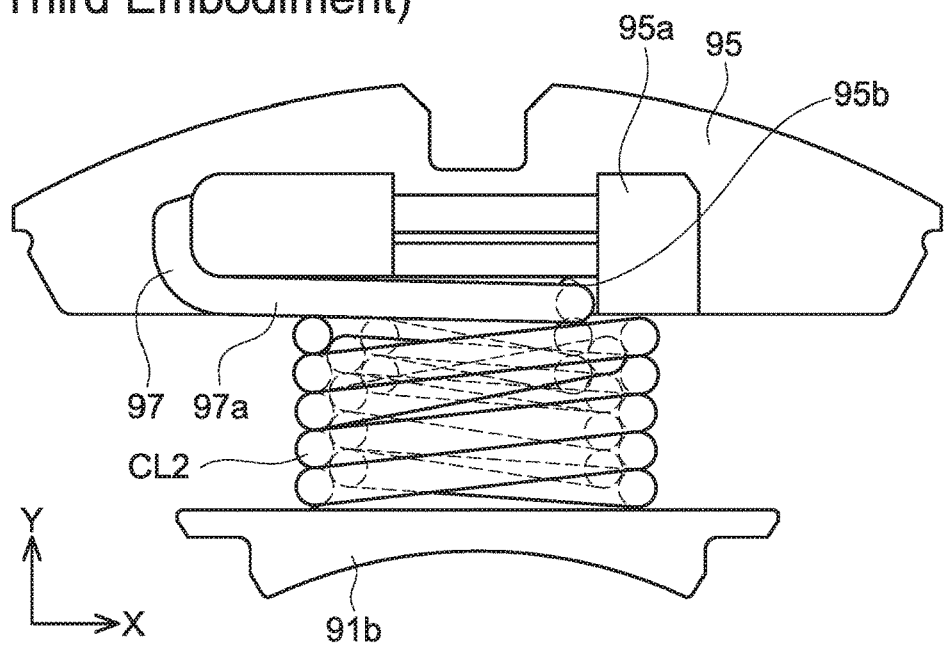
FIG. 16 is a view seeing the partial core from above for explaining the process of winding the wires on the bobbin of the third embodiment.

As shown in FIG. 15, the wire 97 passes through the wire introducing portion 97a similar to the second embodiment, and is arranged in the groove 200. Then, the wire 97 is wound twice in the groove 200. As a result, two turns of the wire 97 that are adjacent along a direction from the periphery 95 to the inner circumferential portion 91b are arranged in the groove 200. As shown in FIG. 17, the wire 97 in the groove 200 is wound along the direction from the periphery 95 toward the inner circumferential portion 91b, that is, in the order of wires C1, C2, C3, C4. Due to this, an adjusting portion 397b is formed within the groove 200.

When the adjusting portion 397b is formed, then the wire 97 is wound to form the first turn in the wire layer CL1 along a recess X301 (see FIG. 17) formed by the turn of the wire 97 at the inner circumferential portion 91b side-end in the adjusting portion 397b and the side surface of the groove 200. According to this configuration, the first turn of the wire 97 in the turns of the wire 97 in the wire layer CL1 can appropriately be positioned. As a result, the turns of the wire 97 in the wire layer CL1 to be wound hereafter can be suppressed from being disturbed.

Next, the wire 97 is wound toward the inner circumferential portion 91b. As shown in FIG. 16, when the wire 97 in the wire layer CL1 is wound until its turn makes contact with the inner circumferential portion 91b (wires C9, C10 in FIG. 17), similar to the first and second embodiments, the wire layer CL2 is formed sequentially from the turn of the wire 97 at the inner circumferential portion 91b side-end of the wire layer CL2 (wires C11, C12 in FIG. 17).

Figure 17:
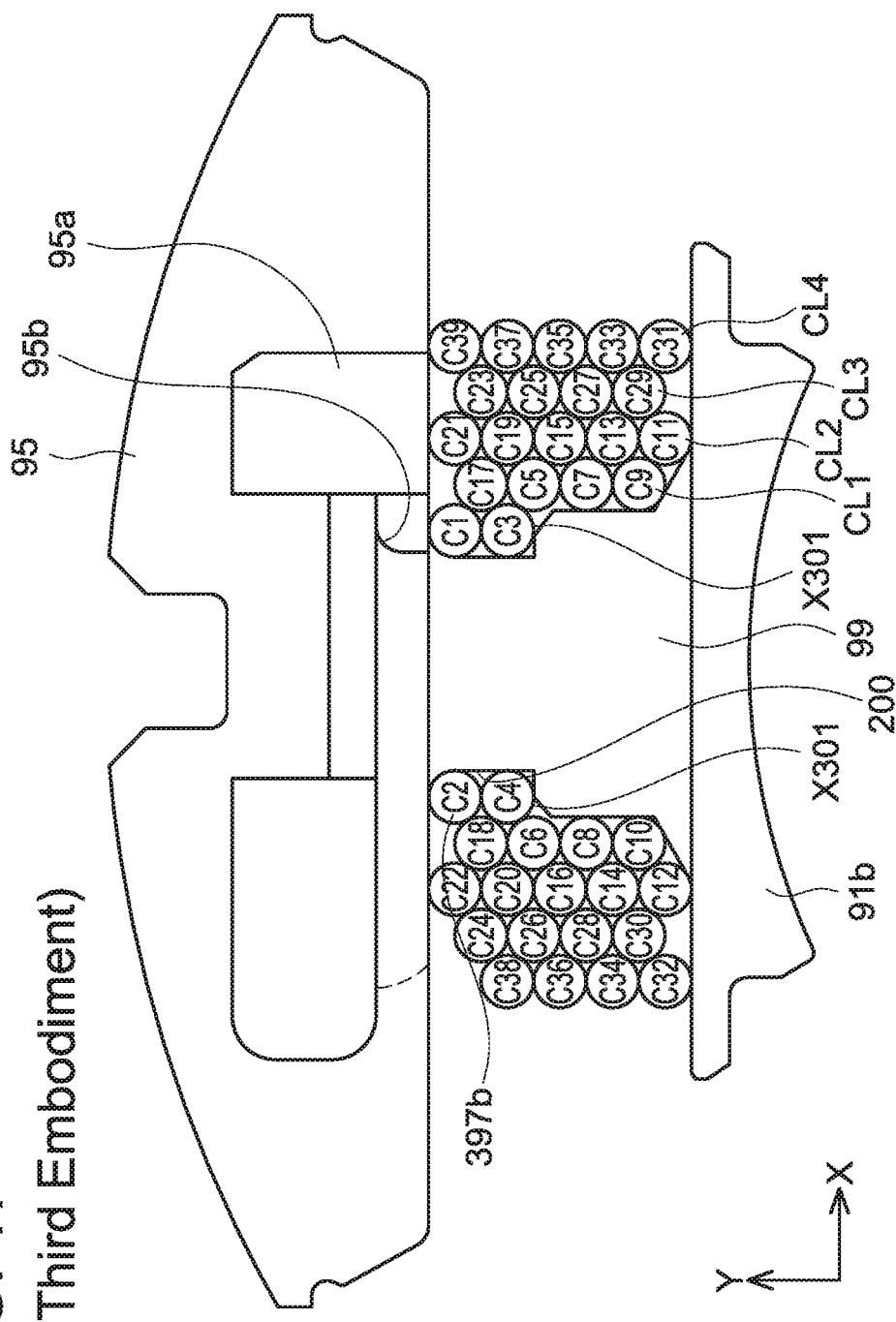
FIG. 17 is a view seeing the partial core from above for explaining a wound state of the wires in the third embodiment.

As shown in FIG. 17, when the turn of the wires C15, C16 is wound in the wire layer CL2, then the wire 97 is wound on the turns of the wires C1 to C4 of the adjusting portion 3976. That is, when the turn of the wires C15, C16 is wound, the wire 97 for forming the wire layer CL1 is then wound. Next, the turn of the wires C19, C20 configuring the wire layer CL2 is formed on the turns of the wires C5, C6, C17, C18, and then the turn of the wires C21, C22 is wound. Due to this, the wire layer CL2 is formed. Hereafter, the wire 97 is wound similar to the first and second embodiments to produce the coil 96 having the wire layers CL1 to CL4.

In the present embodiment as well, the effects similar to those of the first and second embodiments can be achieved.

(Fourth Embodiment)

Figure 21:
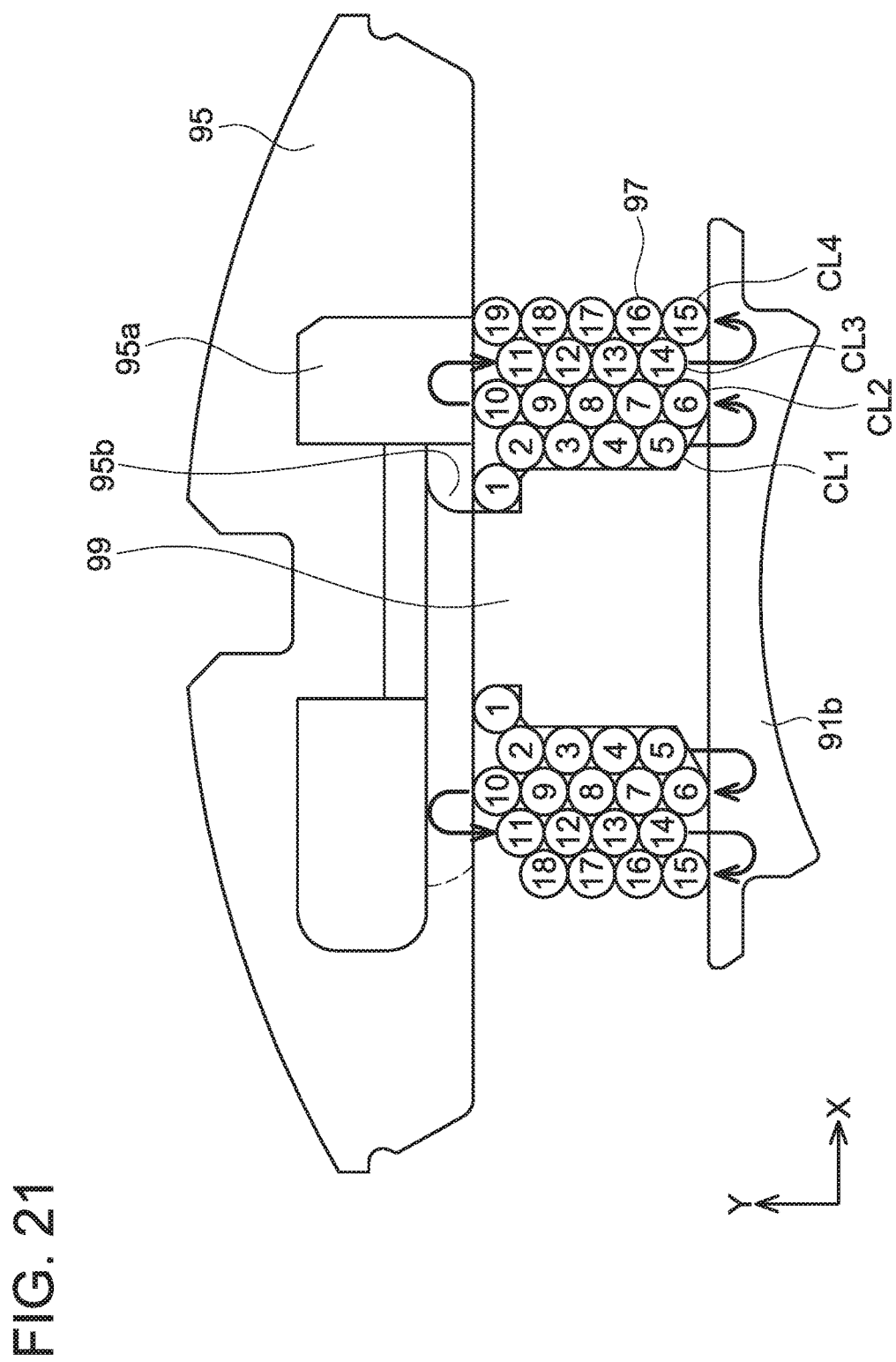
FIG. 21 is a diagram for explaining a wound state of wires in a fourth embodiment.
Figure 22:
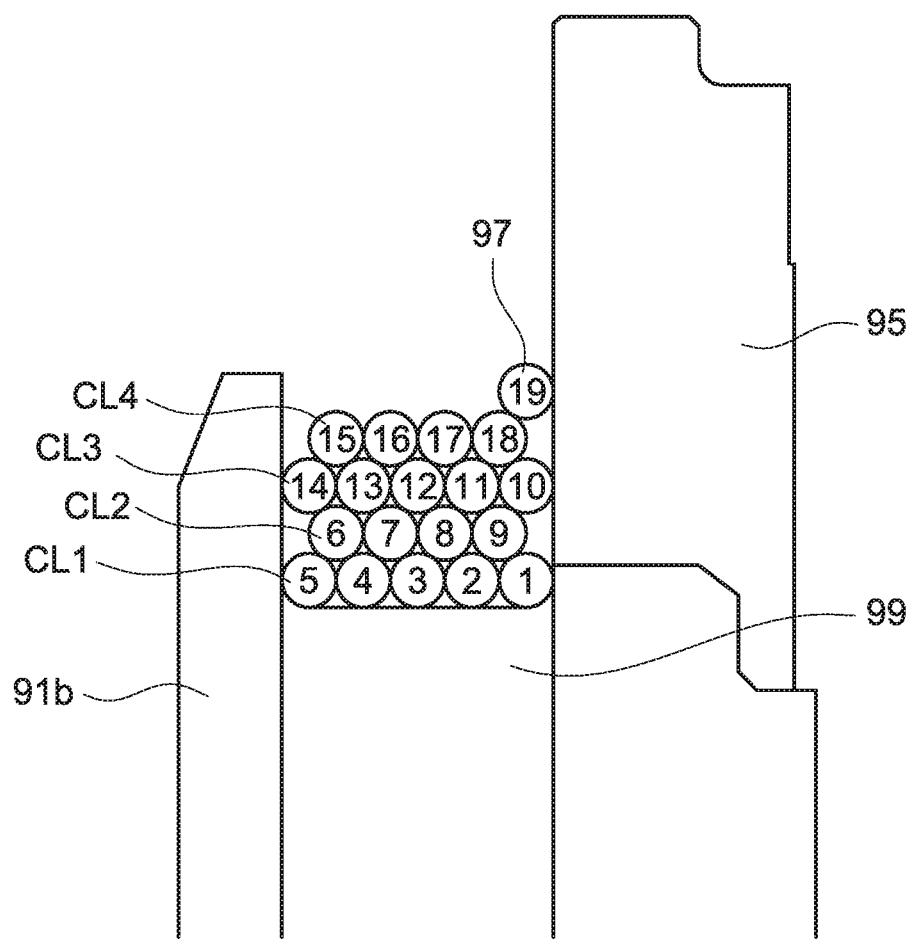
FIG. 22 is a diagram for explaining the wound state of the wires in the fourth embodiment.

In the aforementioned embodiments, the grooves 100, 200 are provided over the entire circumferences of the outer circumferential surfaces of the bobbins 99. However, in this embodiment, the grooves 100 are provided on a pair of surfaces of each tooth 91 that oppose one another with the intermediate portion 91a in between (pair of surfaces extending in the up and down direction) on the outer circumferential surface of each bobbin 99. In this case, the lower end of the wire introducing portion 97a is continued to the wire 97 arranged in the groove 100. FIG. 21 and FIG. 22 show a wound state of the wire 97 in the case where the grooves 100 are provided on the pair of surfaces extending in the up and down direction in the bobbin 99. FIG. 21 shows the wire 97 in a cross section along a position on the upper surface of the bobbin 99, and FIG. 22 shows the wire 97 in a vertical cross section of the upper surface of the bobbin 99 at the center position on the upper surface of the bobbin 99. Notably, the numbers in the wires indicate the number of turns of the wire 97.

As shown in FIG. 21, the wire 97 of the first turn (that is, having the number "1" in the wire 97) is arranged in the grooves 100. On the other hand, on surfaces where the grooves 100 are not provided as shown in FIG. 22, the first turn of the wire 97 corresponds to the wire to be wound first in the first wire layer. On the surfaces provided with the grooves 100, the wire 97 is wound 4 times, 5 times, 4 times, and 5 times, respectively in the first wire layer CL1 to the fourth wire layer CL4. Contrary to this, on the surfaces where the grooves 100 are not provided, the wire 97 is wound 5 times, 4 times, 5 times, and 4 times, respectively in the first wire layer CL1 to the fourth wire layer CL4.

The wire 97 positioned at the periphery 95 side-end of the second wire layer CL2 (that is, having the number "10" in the wire 97 in FIG. 21) slips off along its adjacent wire (that is, having the number "9" in the wire 97 in FIG. 21) similar to first to third embodiments, and is located at the periphery 95 side-end of the second wire layer. As shown in FIG. 22, the wire 97 positioned at the periphery 95 side-end of the second wire layer on the surfaces extending in the up and down direction is positioned at the periphery 95 side-end of the third wire layer on the upper and lower end surfaces of the bobbin 99. Even in this case, the wire 97 is guided by the turn of the wire in the second layer on the surfaces extending in the up and down direction (that is, having the number "9" in the wire 97 in FIG. 21) thus the winding can be performed without having have to bring the winding device 8 close to the periphery 95 to the extent by which the device may make contact with the periphery 95.

In the present embodiment as well, the effects similar to those of the first to third embodiments can be achieved.

Notably, in a variant, the grooves 100 may be formed on upper and lower end surfaces of the bobbin 99 at least on the pair of surfaces of the tooth 91 that are opposed one another with the intermediate portion 91a in between. In this case, the lower end of the wire introducing portion 97a may be continuous to the wire 97 arranged in the groove 100.

Specific examples of the teaching disclosed herein have been described in detail, however, these are mere exemplary indications and thus do not limit the scope of the claims. The art described in the claims includes modifications and variations of the specific examples presented above.

(1) In the aforementioned embodiments, the examples used the brushless motor in the fuel pump 10, however, the brushless motor disclosed herein may be used in other devices such as a cooling water pump, an electric pump, and the like.

Figure 18:
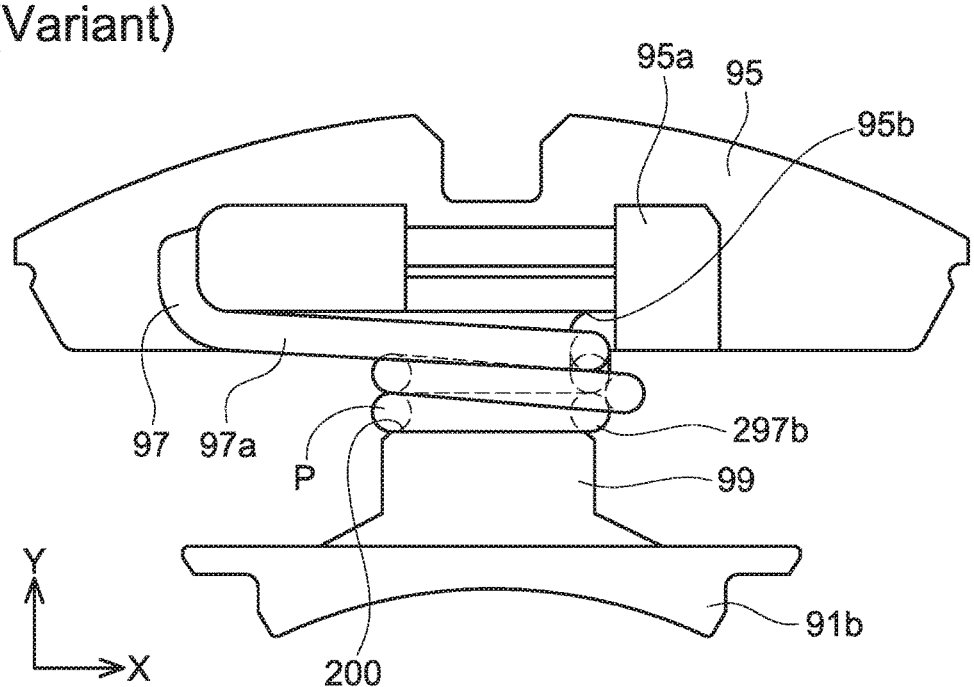
FIG. 18 is a view seeing a partial core from above for explaining a process of winding wires on a bobbin of a variant.
Figure 19:
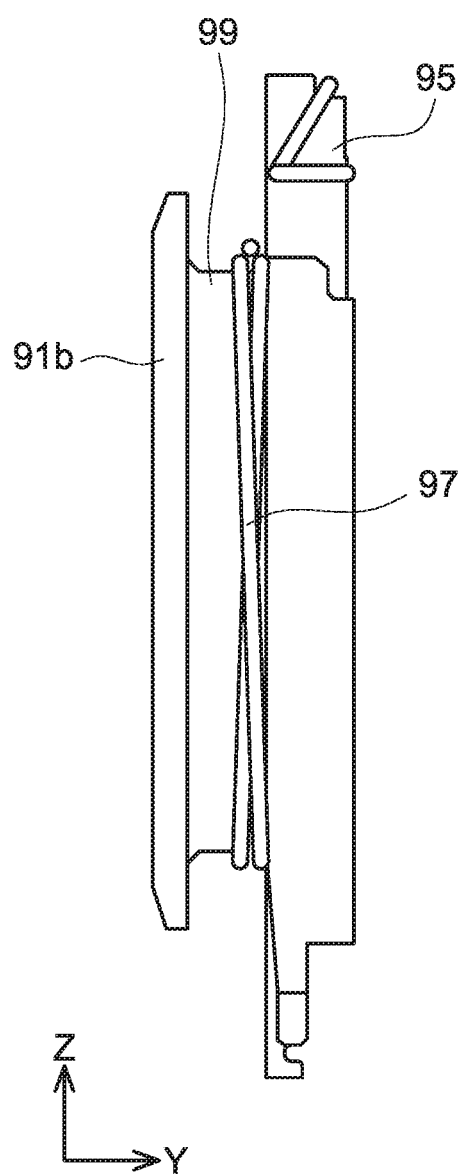
FIG. 19 is a view seeing the partial core from a right side for explaining the process of winding the wires on the bobbin of the variant.
Figure 20:
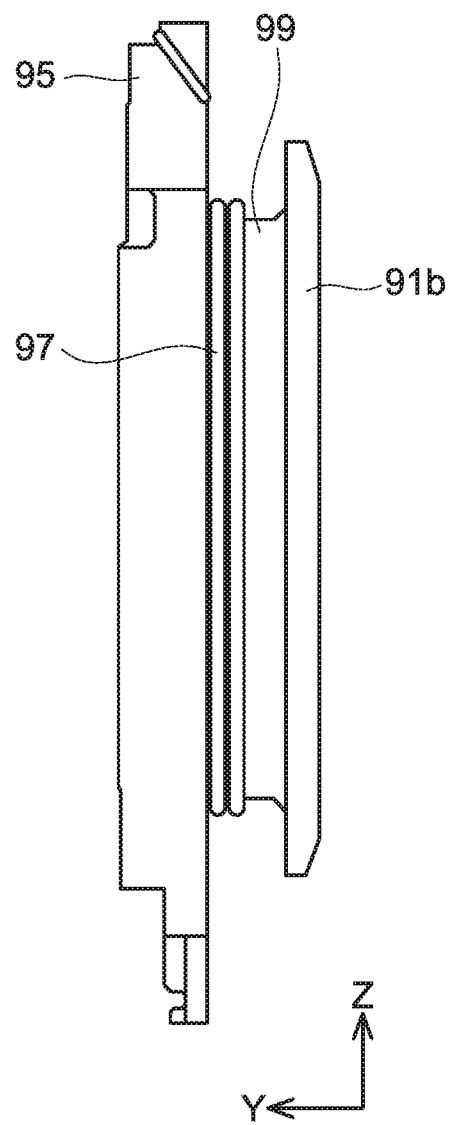
FIG. 20 is a view seeing the partial core from a left side for explaining the process of winding the wires on the bobbin of the variant.

(2) In the aforementioned second embodiment, the wire 97 in the groove 200 is wound sequentially in the direction from the periphery 95 toward the inner circumferential portion 91b. However, as shown in FIGS. 18 to 20, in the adjusting portion 297b, after the wire 97 is introduced into the groove 200 from the wire introducing portion 97a, it may progress along the inner circumferential portion 91b side-end of the groove 200 (position shown by P in FIG. 18) while winding one turn in the groove 200. Then, the wire 97 is arranged parallel to the Y axis at the upper end of the bobbin 99. Then, as shown in FIG. 19, the turns of the wire 97 may be wound so as to intersect on one of the side surfaces of the bobbin 99 (which is the right side surface in FIG. 18) and be arranged parallel on the other side surface of the bobbin 99 (which is the left side surface in FIG. 18).

(3) The aforementioned embodiments describe the motor 50 being a three-phase motor having six slots, however, the motor may be a three-phase motor having 3×N slots (where N is a positive integer). In this case, 3×N pieces of partial cores may be included in the stator. Further, the 3×N pieces of partial cores may be categorized into N core groups. Further, among the three partial cores belonging to one core group, their opposing surfaces may be in contact. On the other hand, at least a pair of opposing surfaces positioned between core groups may be arranged with a clearance in between them. Notably, a pair of opposing surfaces belonging to adjacent partial cores in the same core group may be arranged with a clearance in between them.

(Fifth Embodiment)

Figure 23:
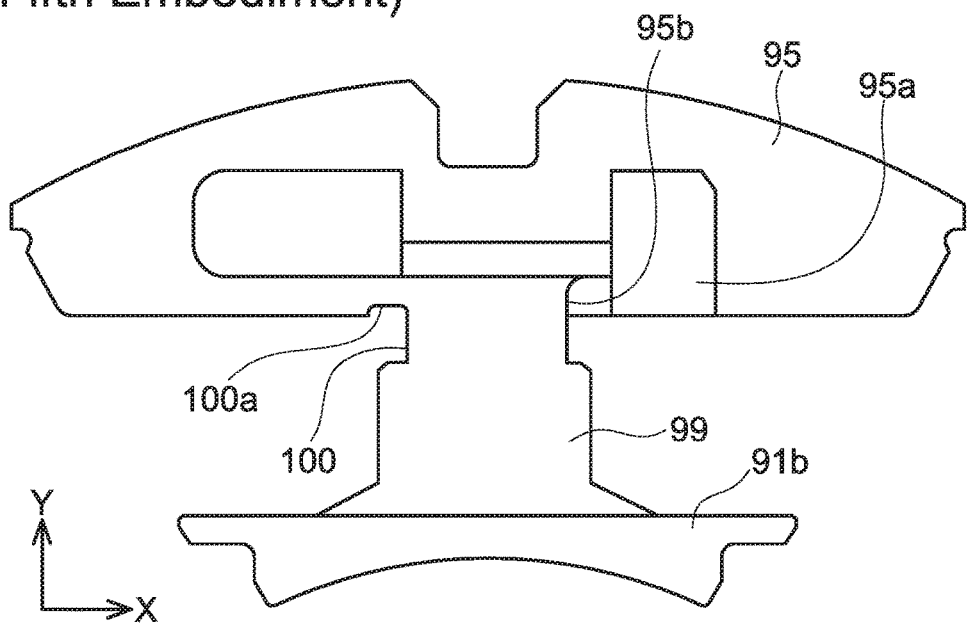
FIG. 23 is a plan view of a partial core of a fifth embodiment.

Points differing from the first embodiment will be described with reference to FIGS. 23, 24. In the present embodiment, as compared to the first embodiment, a width of the groove 100, that is, the length of the groove 100 in the radial direction of the stator 60 (that is, Y axis direction) at a part of the groove 100 is longer than the width of the groove 100 of the first embodiment by k. This k is larger than 0 and smaller than the wire diameter of the wire 97. Due to this, the width of the groove 100 becomes W+k (where W is a value obtained by multiplying the wire diameter D of the wire 97 to the number of turns wound in the groove 100, and 0<k<D). For example, k may be equal to or greater than ¼ but equal to or less than ¾ of the wire diameter of the wire 97.

Specifically, within the groove 100 provided over the entire circumference of the outer circumferential surface of the bobbin 99, an enlarged width portion 100a is provided at a portion, which is a portion extending in the axial direction of the periphery 95 (that is, vertical direction relative to a sheet surface of FIG. 23), on a side where no expanded portion 95b is provided. The enlarged width portion 100a is arranged on the periphery 95 side-end of the groove 100. The enlarged width portion 100a is provided on the inner circumferential surface of the periphery 95. A depth of the enlarged width portion 100a, that is, the length of the groove 100 in the radial direction of the stator 60 is the aforementioned k. Further, a height of the enlarged width portion 100a, that is, a length in a direction parallel to the inner circumferential surface of the periphery 95 (that is, X axis direction) is substantially same as the wire diameter of the wire 97. The enlarged width portion 100a has a same length as the bobbin 99 in a direction vertical to an XY plane. Notably, in a variant, the enlarged width portion 100a may be shorter than the bobbin 99 in the direction vertical to the XY plane.

Figure 24:
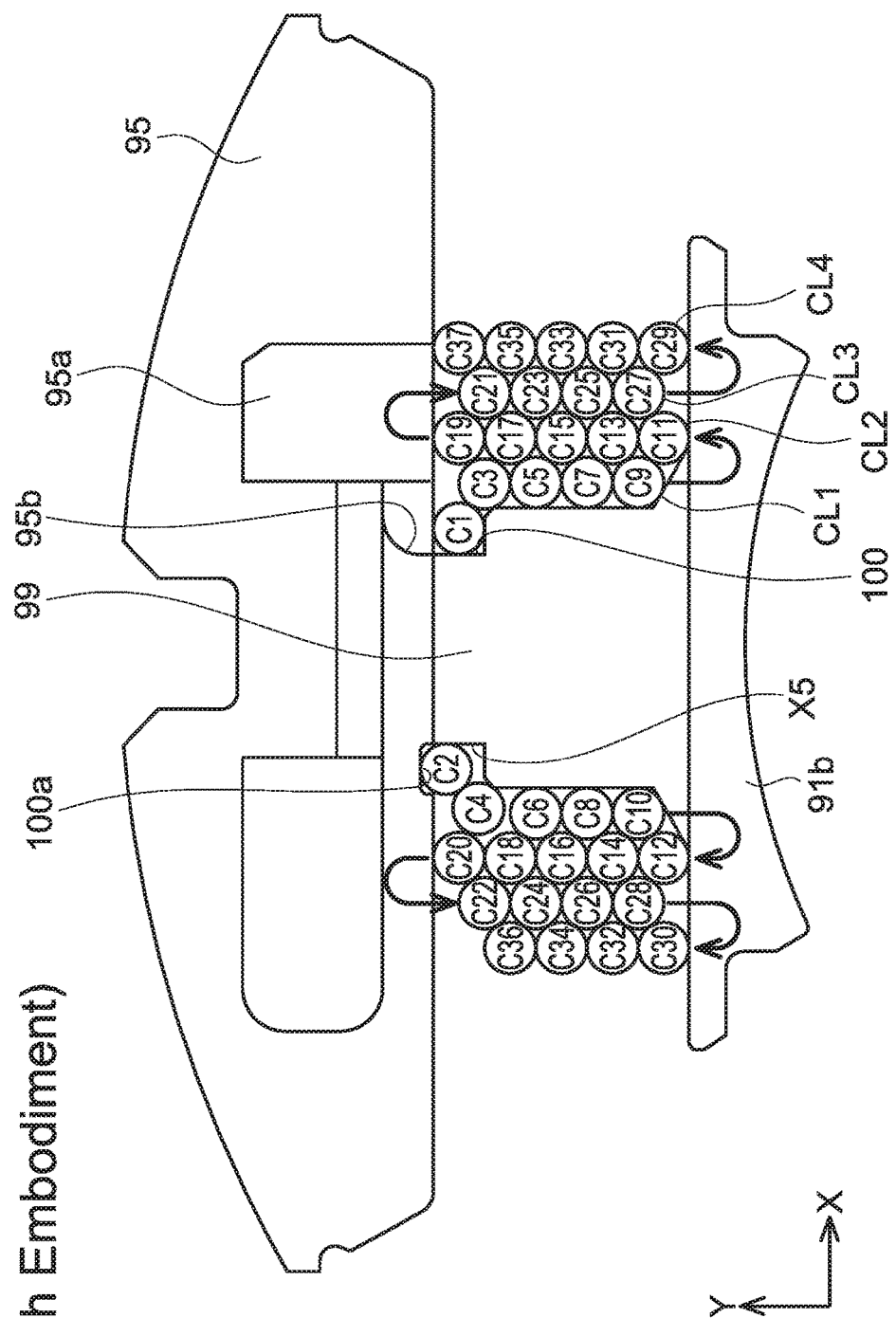
FIG. 24 is a diagram for explaining a wound state of wires in the fifth embodiment.

As shown in FIG. 24, when the wire 97 is wound using the same winding method as the first embodiment, the wire C2 at the stage of winding the wire C2 is wound on the same position in the Y axis direction as the wire C1. Further, at the stage of winding the wire C4, the wire C4 is arranged between the wire C2 and the side surface of the groove 100. At this occasion, the wire C2 is pressed toward an enlarged width portion 100a side by the wire C4, and is moved until it makes contact with the periphery 95. Due to this, a recess X5 is created between the wire C2 and the side surface of the groove 100. A length of the recess X5 in the Y axis direction is same as the aforementioned k. The wire C4 is wound along the recess X5 while being in a state of fitting in the recess X5. According to this configuration, the wire CA can appropriately be positioned by the recess X5. As a result, at the stages of winding the wire C5 and further, the wire C4 is suppressed from moving toward the inner circumferential portion 91b side from the recess X5 thereby creating disturbance in the turns of the wire 97 in the wire layer CL1.

(Sixth Embodiment)

Figure 25:
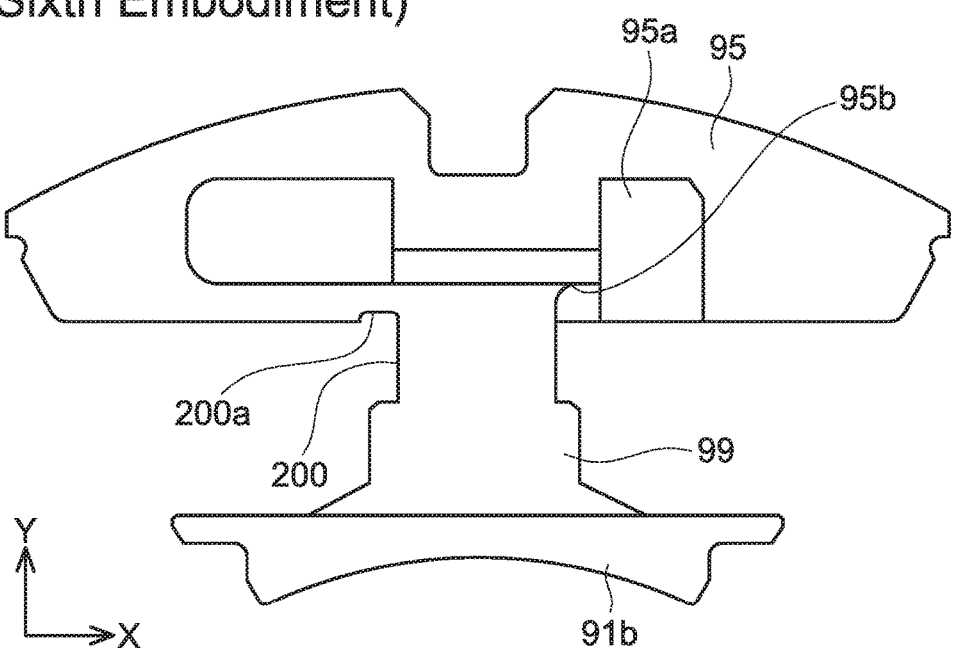
FIG. 25 is a plan view of a partial core of a sixth embodiment.
Figure 26:
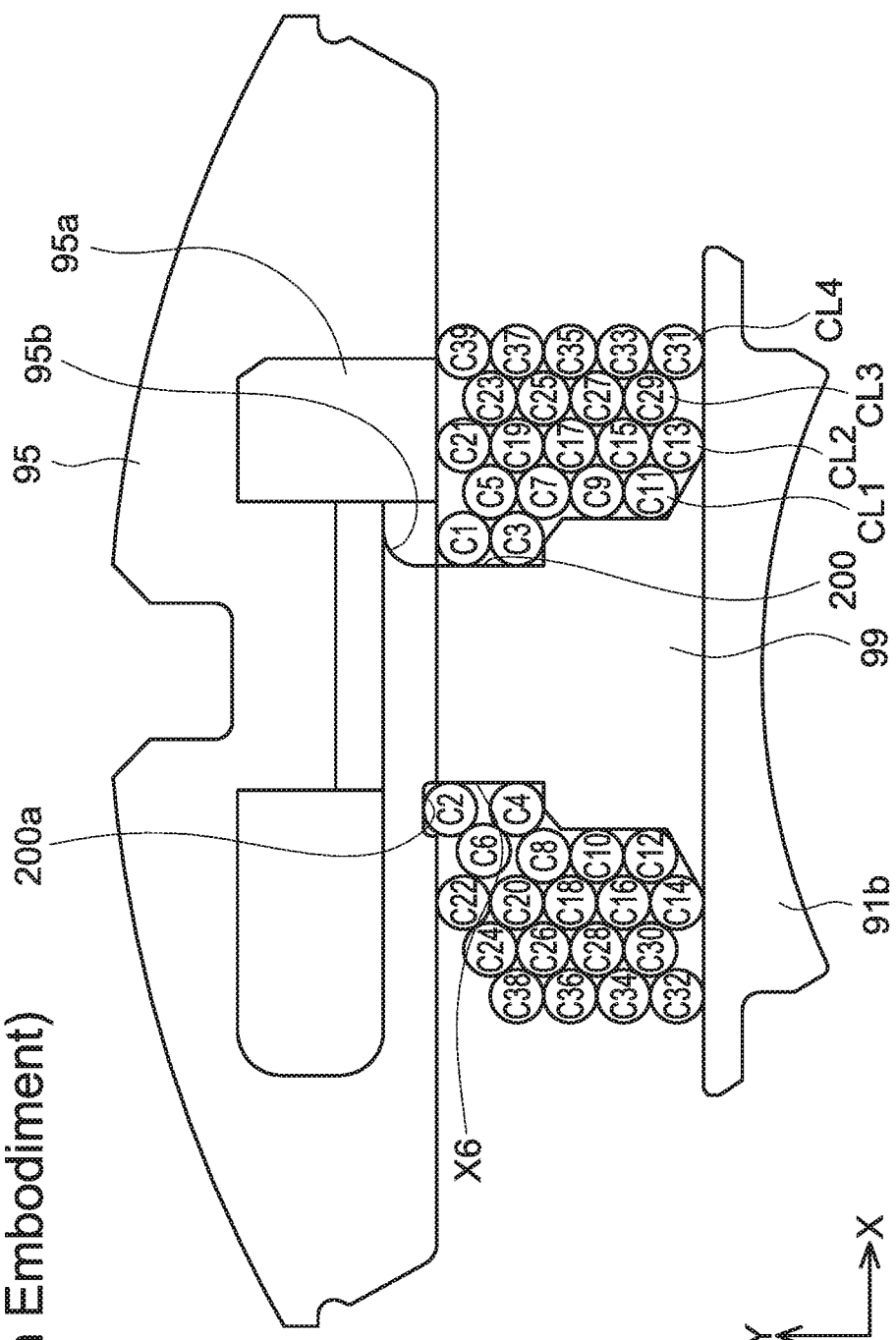
FIG. 26 is a diagram for explaining a wound state of wires in the sixth embodiment.

Points differing from the second embodiment will be described with reference to FIGS. 25, 26. In the present embodiment, as compared to the second embodiment, a width of the groove 200, that is, the length of the groove 200 in the radial direction of the stator 60 (that is, Y axis direction) at a part of the groove 200 is longer than the width of the groove 200 of the second embodiment by k. This k is larger than 0 and smaller than the wire diameter of the wire 97. For example, k may be equal to or greater than ¼ but equal to or less than ¾ of the wire diameter of the wire 97.

Specifically, an enlarged width portion 200a similar to the enlarged width portion 100a is provided at the periphery 95 side-end of the groove 200. As shown in FIG. 26, when the wire 97 is wound using the same winding method as the second embodiment, at the stage of winding the wires C1 to C4, the wires C2, C4 are wound on the corresponding same positions as the wires C1, C3, respectively in the Y axis direction. Further, at the stage of winding the wire C6, the wire C6 is arranged between the wire C2 and the wire C4. At this occasion, the wire C2 is pressed toward the enlarged width portion 200a side by the wire C6, and is moved until it makes contact with the periphery 95. Due to this, a recess X6 is created between the wire C2 and the wire C4. A length of the recess X6 in the Y axis direction is same as the aforementioned k. The wire C6 is wound along the recess X6 while being in a state of fitting in the recess X6. According to this configuration, the wire C6 can appropriately be positioned by the recess X6. As a result, at the stages of winding the wire C6 and further, the wire C6 is suppressed from moving toward the inner circumferential portion 91b side from the recess X6 thereby creating disturbance in the turns of the wire 97 in the wire layer CL1.

(Seventh Embodiment)

Figure 27:
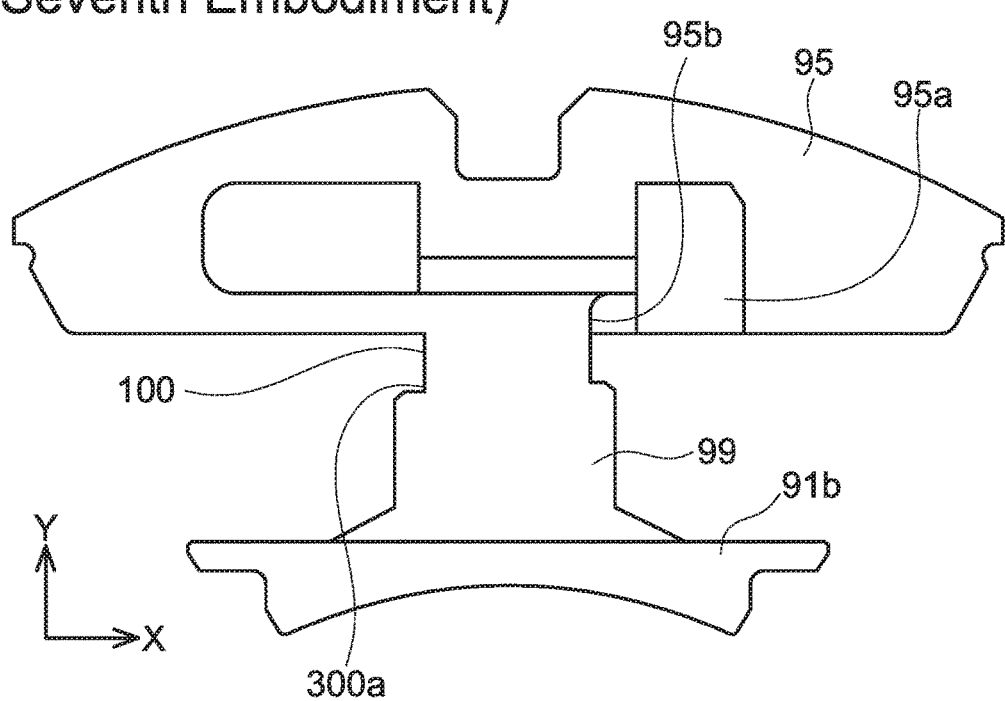
FIG. 27 is a plan view of a partial core of a seventh embodiment.

Points differing from the fifth embodiment will be described with reference to FIGS. 27, 28. In the present embodiment, an enlarged width portion 300a is arranged on the inner circumferential portion 91b of the groove 100. In other words, the width of the groove 100 is enlarged by k toward the inner circumferential portion 91b side at the portion where the enlarged width portion 300a is arranged. The enlarged width portion 300a has a same length as the bobbin 99 in the direction vertical to the XY plane. Notably, in a variant, the enlarged width portion 300a may be shorter than the bobbin 99 in the direction vertical to the XY plane.

Figure 28:
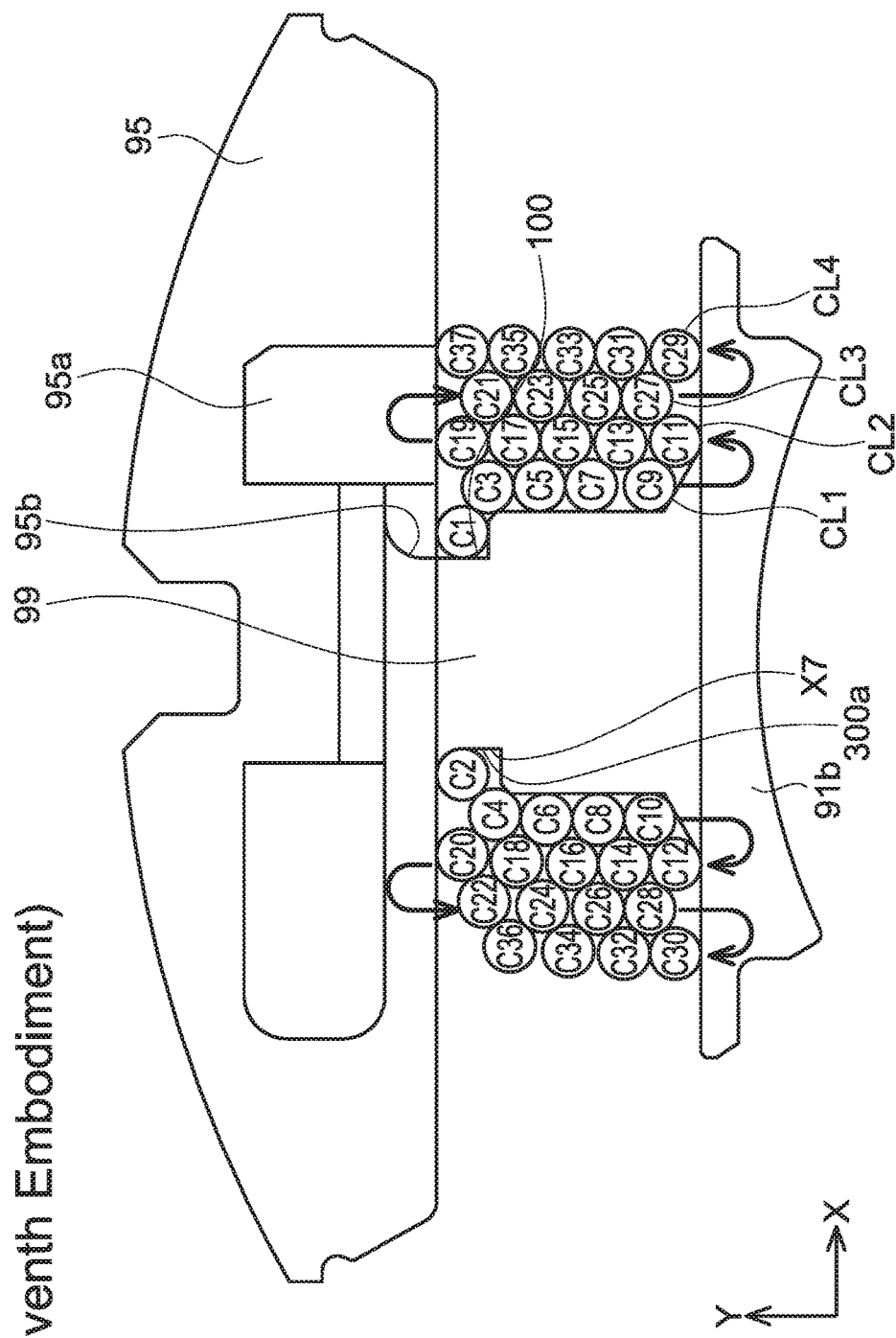
FIG. 28 is a diagram for explaining a wound state of wires in the seventh embodiment.

As shown in FIG. 28, when the wire 97 is wound using the same winding method as the first embodiment, the wire C2 at the stage of winding the wire C2 is wound on the same position as the wire C1. Further, at the stage of winding the wire C4, the wire C4 is wound along a recess X7 created between the wire C2 and the side surface of the groove 100 while being in a state of fitting in the recess X7. According to this configuration, the wire C4 can appropriately be positioned by the recess X7. As a result, at the stages of winding the wire C7 and further, the wire C4 is suppressed from moving toward the inner circumferential portion 91b side from the recess X7 thereby creating disturbance in the turns of the wire 97 in the wire layer CL1.

(Eighth Embodiment)

Figure 29:
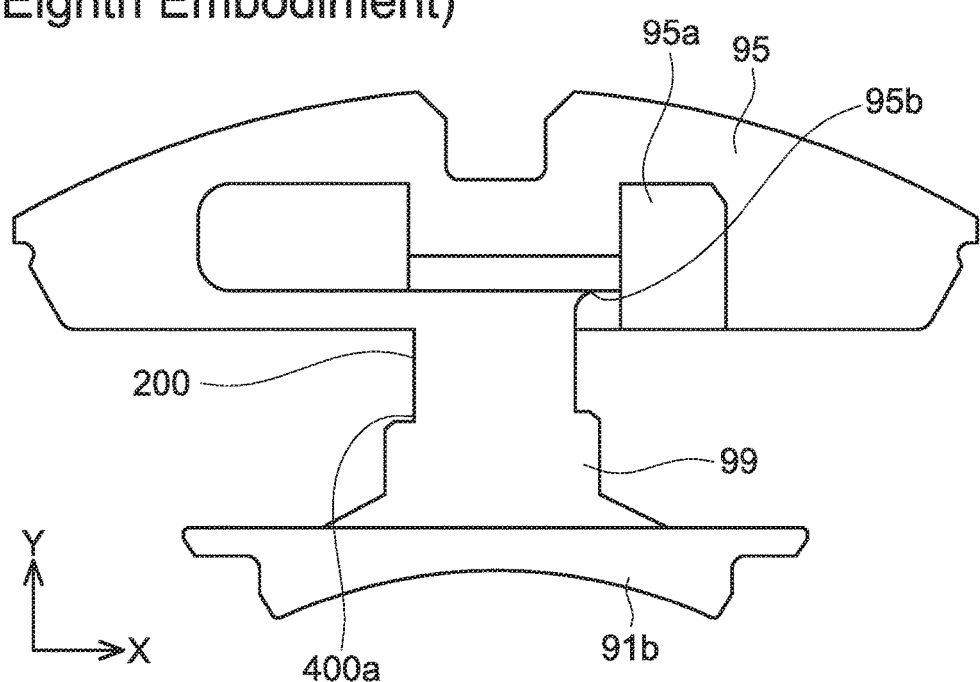
FIG. 29 is a plan view of a partial core of an eighth embodiment.
Figure 30:
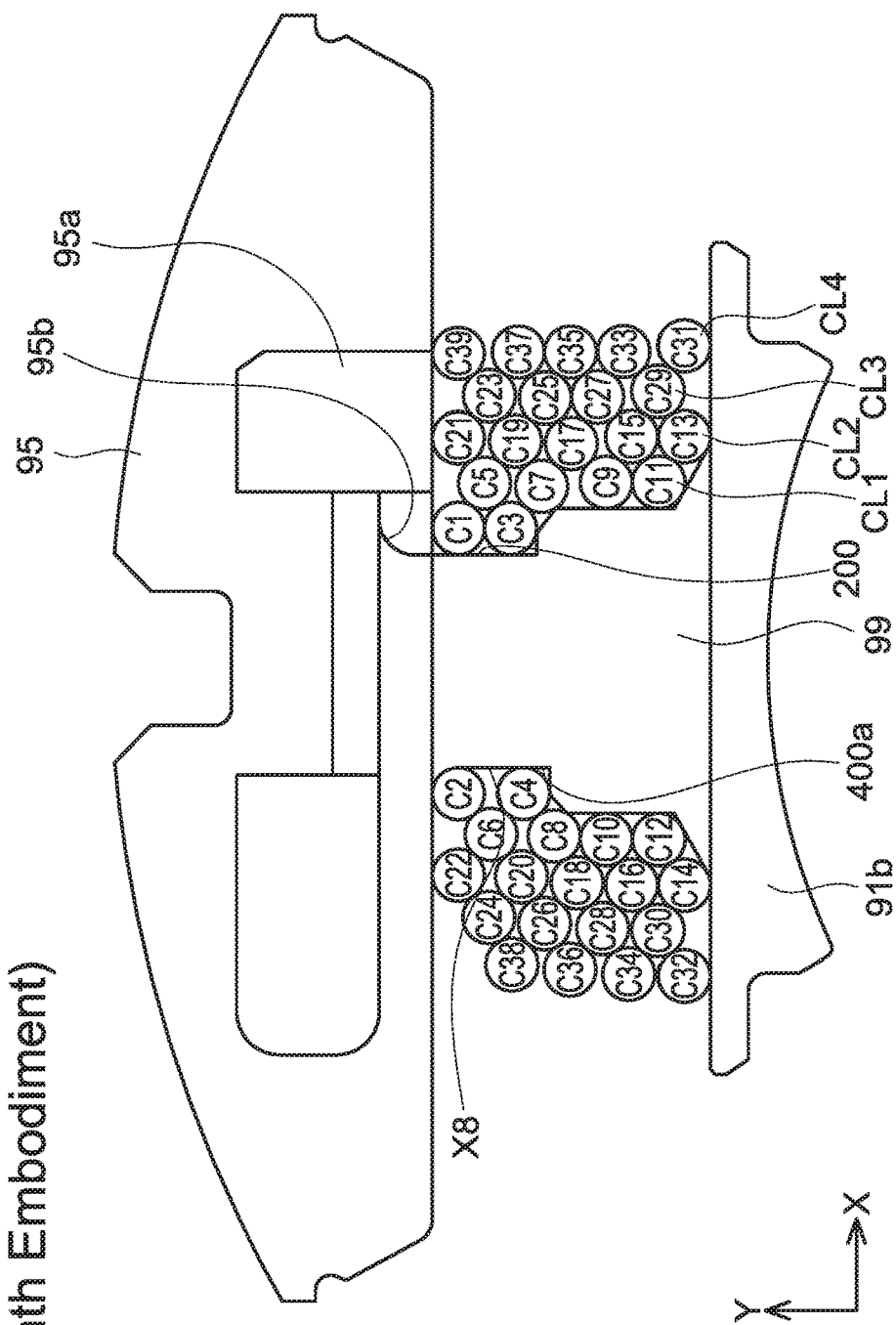
FIG. 30 is a diagram for explaining a wound state of wires in the eighth embodiment.

Points differing from the sixth embodiment will be described with reference to FIGS. 29, 30. In the present embodiment, an enlarged width portion 400a is arranged on the inner circumferential portion 91b of the groove 200 similar to the enlarged width portion 300a. In this configuration, as shown in FIG. 30, at the stage of winding the wires C1 to C4, the wires C2, C4 are wound on the corresponding same positions as the wires C1, C3, respectively in the Y axis direction. Further at the stage of winding the wire C6, the wire C6 is arranged between the wire C2 and the wire C4. At this occasion, the wire C4 is pressed toward the inner circumferential portion 91b side by the wire C6, and is moved until it makes contact with a side surface of the enlarged width portion 400a. Due to this, a recess X8 is created between the wire C2 and the wire C4. The wire C6 is wound along the recess X8 while being in a state of fitting in the recess X8. According to this configuration, the wire C6 can appropriately be positioned by the recess X8. As a result, at the stages of winding the wire C6 and further, the wire C6 is suppressed from moving toward the inner circumferential portion 91b side from the recess X8 thereby creating disturbance in the turns of the wire 97 in the wire layer CL1.

Specific examples of the teaching disclosed herein have been described in detail, however, these are mere exemplary indications and thus do not limit the scope of the claims. The art described in the claims includes modifications and variations of the specific examples presented above.

Figure 31:
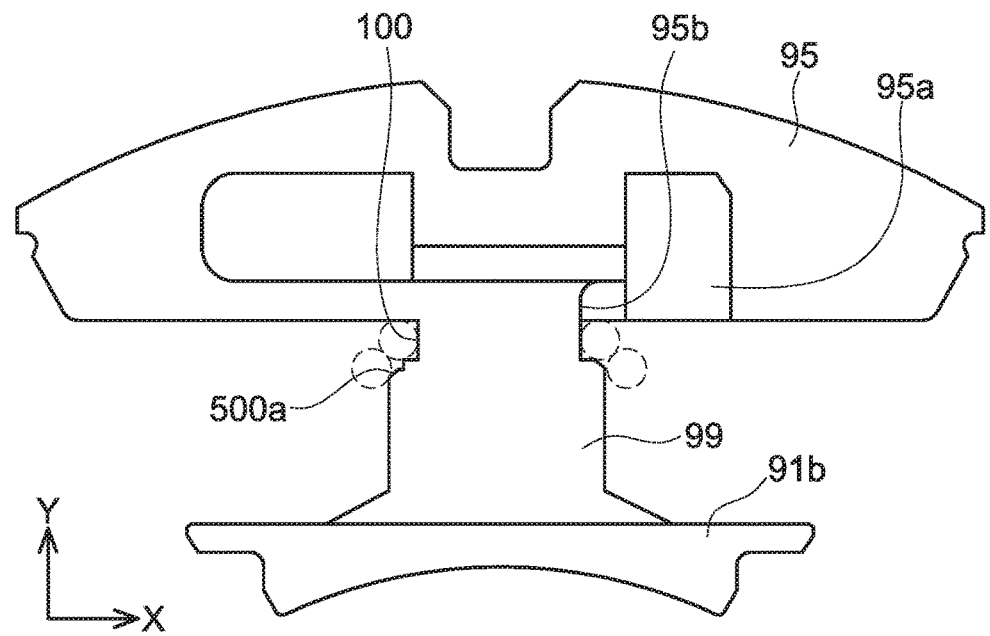
FIG. 31 is a plan view of a partial core of a variant.

For example, the enlarged width portion 300a of the seventh embodiment has the same depth as the groove 100 (that is, its length in the X axis direction), however, a shape of the enlarged width portion 300a is not limited hereto. For example, as shown in FIG. 31, a depth of an enlarged width portion 500a may be shallower than the groove 100. Shapes of other enlarged width portions 500a may be similar to that of the enlarged width portion 300a.

Figure 32:
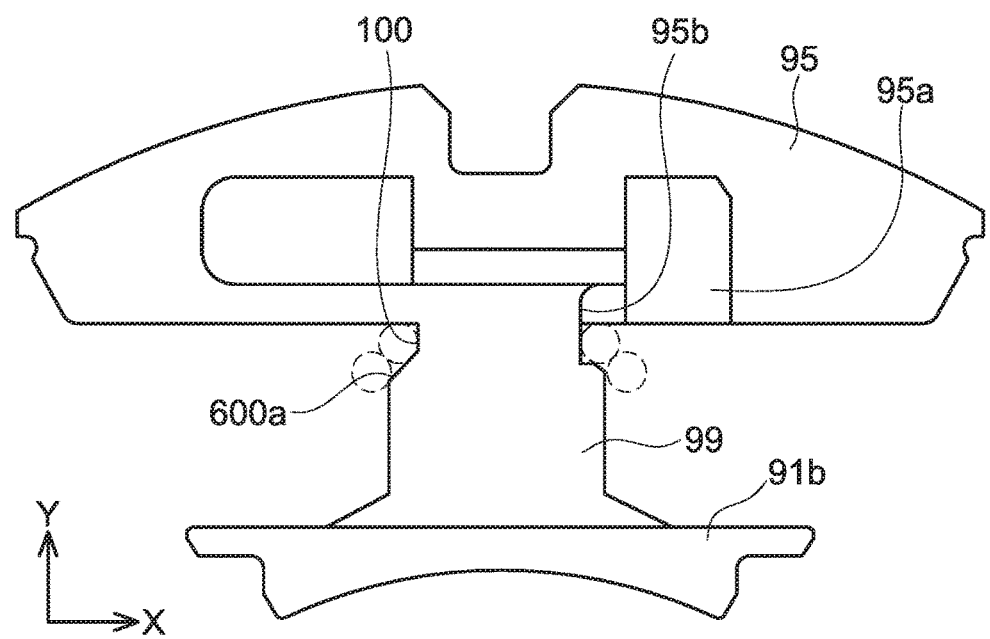
FIG. 32 is a plan view of a partial core of a variant.

Further, for example, the width of the enlarged width portion 300a of the seventh embodiment (that is, its length in the Y axis direction) is constant along the X axis direction, however, the shape of the enlarged width portion 300a is not limited hereto. For example, as shown in FIG. 32, a width of an enlarged width portion 600a may change along the X axis direction. For example, the enlarged width portion 600a may be formed by chamfering the side surface of the groove 100 on the inner circumferential portion 91b side.

Figure 33:
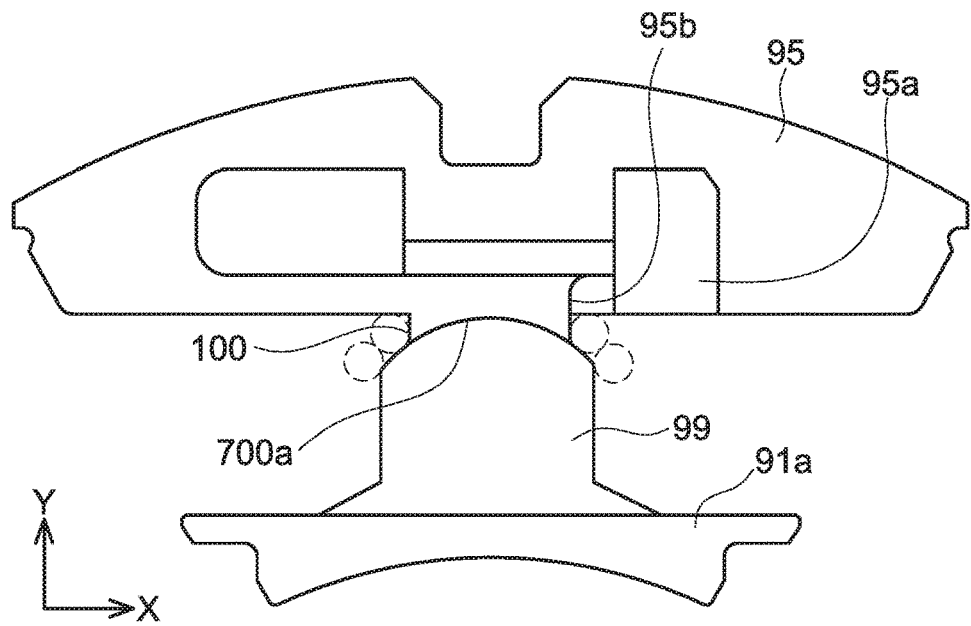
FIG. 33 is a plan view of a partial core of a variant.
Figure 34:
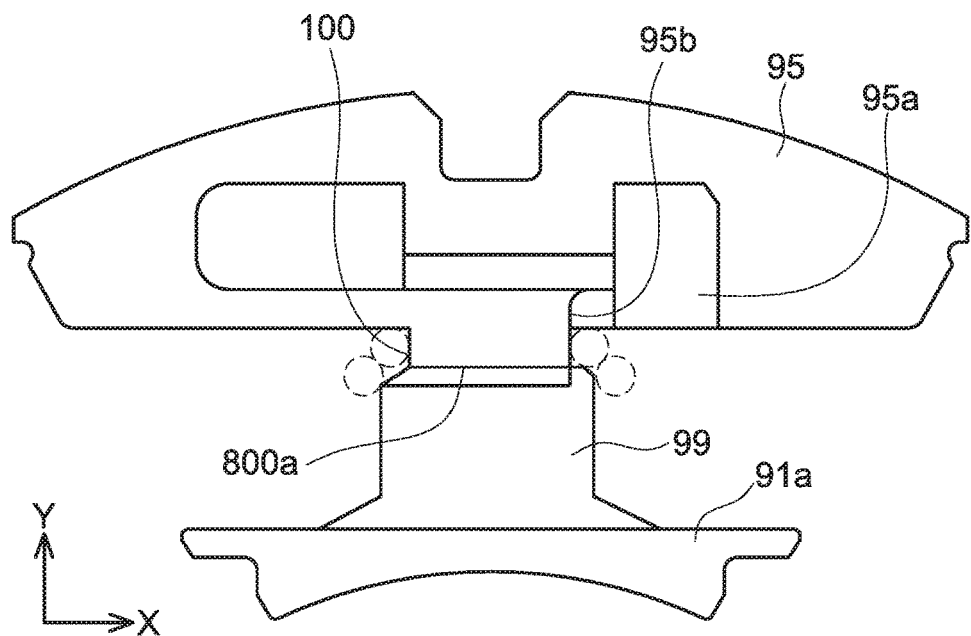
FIG. 34 is a plan view of a partial core of a variant.

Moreover, as shown in FIG. 33, a surface of the bobbin 99 where the groove 100 is to be provided may be configured by a curved surface 700a to form an enlarged width portion. Alternatively, as shown in FIG. 34, the groove 100 may be enlarged by providing an inclined surface 800a where the end of the bobbin 99 on the groove 100 side is gradually lowered from the side where the expanded portion 95b is provided.

The aforementioned enlarged width portions 500a to 800a may be generalized as "an enlarged width portion that enlarges a width of at least an outer circumferential side-end of a bobbin (or an end thereof separated from a tooth side-surface)". Further, each of the enlarged width portions 500a to 800a corresponds to the configuration in which "a width of a groove is W+k (where W is a value obtained by multiplying the wire diameter D of the wire 97 to a number of turns wound in the adjusting portion, and 0<k<D)", and the configuration in which "a width of a groove is enlarged at a portion located on one of a pair of surfaces in the groove". Notably, each of the enlarged width portions 500a to 800a may be adapted as an enlarged width portion for enlarging the width of the groove 200.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

REFERENCE SIGNS LIST

10: Fuel Pump, 30: Pump, 50: Motor, 54: Rotor, 60: Stator, 90: Core Main Body, 91: Teeth, 91a: Intermediate Portion, 91b: Inner Circumferential Portion, 95: Periphery, 96: Coil, 99: Bobbin, U1, V1, W1, U2, V2, W2: Partial Core

The invention claimed is:

1. A stator of a motor, the stator comprising:
a periphery having a cylindrical shape;
a plurality of teeth extending from an inner circumferential surface of the periphery toward an inner circumferential side, the plurality of teeth being disposed along a circumferential direction of the periphery with intervals between one another;
a plurality of bobbins respectively attached to the plurality of teeth, each bobbin surrounding a side surface of the corresponding tooth at an intermediate position between a first end of the tooth on a periphery side and a second end of the tooth on an opposite side from the first end; and
a plurality of coils respectively disposed on the plurality of bobbins,
wherein each of the plurality of bobbins comprises:
a first end-side end located on a first end side;
a circumferential surface including a pair of surface portions opposing each other when seen in a cross section along an extending direction of the corresponding tooth; and
a groove located at the first end-side end on at least the pair of surface portions;
each of the plurality of coils comprises:
a wire introducing portion where a wire of the coil is introduced from outside of the bobbin into the groove;
an adjusting portion continuously disposed with the wire introducing portion, the adjusting portion including one or two adjacent turns of the wire in the groove among turns of the wire wound one or two times around the bobbin; and
a plurality of wire layers, each of the plurality of wire layers including turns of the wire disposed adjacent to each other along the extending direction of the corresponding tooth, a first wire layer of a lowest layer disposed on the pair of surface portions, among the plurality of wire layers, contacting turns of the wire included in the adjusting portion and the circumferential surface of the bobbin, and
in each of the plurality of coils disposed on the corresponding pair of surface portions:
an odd-numbered wire layer among the plurality of wire layers disposed on the corresponding pair of surface portions has the wire wound successively from the first end side toward a second end side, and a turn of the wire located at the first end side-end is separated from the inner circumferential surface of the periphery by a half pitch;
an even-numbered wire layer among the plurality of wire layers disposed on the corresponding pair of surface portions has the wire wound successively from the second end side toward the first end side;
each of second and subsequent wire layers among the plurality of wire layers includes a turn of the wire located on an end surface of the bobbin on a wire introducing portion side, and turns of the wire other than the turn of the wire located on the end surface of the bobbin;
the turns of the wire other than the turn of the wire located on the end surface of the bobbin are disposed along recesses between two adjacent turns of the wire in a wire layer located one layer lower; and
the turn of the wire located on the end surface of the bobbin is disposed in a direction intersecting the turns of the wire in the wire layer located one layer lower.

2. The stator as in claim 1, wherein
each groove is located on at least a pair of surface portions included in the circumferential surface of the corresponding bobbin, the one pair of surface portions extending along an axial direction of the periphery,
each of the plurality of bobbins comprises an enlarged width portion enlarging a width of the groove at a portion of the groove located on one of the pair of surface portions, a width of the enlarged width portion being smaller than a wire diameter of the wire, and
the introducing portion is disposed at a portion of the groove located on another of the pair of the surface portions.

3. The stator as in claim 1, wherein
a specific wire to be wound to form a first turn in the first wire layer is disposed along the turns of the wire wound in the adjusting portion.

4. The stator as in claim 3, wherein
the adjusting portion includes a turn of the wire wound once adjacent to a side wall defining the groove, and
the specific wire is disposed along a recess between the turn of the wire wound at the adjusting portion and an upper end of the side wall.

5. The stator as in claim 3, wherein
the adjusting portion includes two turns of the wire disposed adjacent to each other,
one of the two turns of the wire is located on the second end side, and is adjacent to a side wall defining the groove, and
the specific wire is disposed along a recess between the one of the two turns of the wire and an upper end of the side wall.

6. The stator as in claim 3, wherein
the adjusting portion includes two adjacent turns of the wire disposed adjacent to each other, and the specific wire is wound around along a recess between the two adjacent turns of the wire of the adjusting portion.

7. The stator as in claim 1, wherein
the odd-numbered wire layer includes the turn of the wire located at the first end side-end separated from the inner circumferential surface of the periphery by a half pitch, and
the even-numbered wire layer includes a turn of the wire located at the first end side-end in contact with the inner circumferential surface of the periphery.

8. The stator as in claim 1, wherein
the groove surrounds the circumferential surface of the bobbin at the first end side-end.

9. A brushless motor comprising: the stator of claim 1; and a rotor disposed facing the second ends of the teeth.

10. A stator of a motor, the stator comprising:
a periphery having a cylindrical shape;
a plurality of teeth extending from an inner circumferential surface of the periphery toward an inner circumferential side, the plurality of teeth being disposed along a circumferential direction of the periphery with intervals between one another;
a plurality of bobbins respectively attached to the plurality of teeth, each bobbin surrounding a side surface of the corresponding tooth at an intermediate position between a first end of the tooth on a periphery side and a second end of the tooth on an opposite side from the first end; and
a plurality of coils disposed on the plurality of bobbins, wherein each of the plurality of bobbins comprises:
a first end-side end located on a first end side;
a circumferential surface including a pair of surface portions opposing each other when seen in a cross section along an extending direction of the corresponding tooth;
a groove located at the first end-side end on at least the pair of surface portions; and
an enlarged width portion enlarging a width of the groove at a portion of the groove located on one of the pair of the surface portions, a width of the enlarged width portion being smaller than a wire diameter of a wire of the coil,
each of the plurality of coils comprises:
a wire introducing portion where the wire of the coil is introduced from outside of the bobbin into the groove at a portion located on another of the pair of surface portions;
an adjusting portion continuously disposed with the wire introducing portion, the adjusting portion including one or two adjacent turns of the wire in the groove among turns of the wire wound one or two times around the bobbin; and
a plurality of wire layers, each of the plurality of wire layers including the turns of the wire disposed adjacent to each other along the extending direction of the corresponding tooth, a lowest layer disposed on the pair of surface portions, among the plurality of wire layers, contacting turns of the wire included in the adjusting portion and the circumferential surface of the bobbin;
in each of the plurality of coils disposed on the corresponding pair of surface portions:
an odd-numbered wire layer among the plurality of wire layers disposed on the at least one pair of surface portions has the wire wound successively from the first end side toward a second end side;
an even-numbered wire layer among the plurality of wire layers disposed on the at least one pair of surface portions has the wire wound around successively from the second end side toward the first end side;
each of second and subsequent wire layers among the plurality of wire layers includes a turn of the wire located on an end surface of the bobbin on a wire introducing portion side, and turns of the wire other than the turn of the wire located on the end surface of the bobbin;
the turns of the wire other than the turn of the wire located on the end surface of the bobbin are disposed along recesses between two adjacent turns of the wire in a wire layer located one layer lower; and
the turn of the wire located on the end surface of the bobbin is disposed in a direction intersecting the turns of the wire in the wire layer located one layer lower.

* * * * *